US009581859B2

(12) United States Patent
Shikii et al.

(10) Patent No.: US 9,581,859 B2
(45) Date of Patent: Feb. 28, 2017

(54) OPTICAL DEFLECTOR, OPTICAL DEFLECTION APPARATUS, AND LIQUID CRYSTAL DISPLAY APPARATUS USING THE OPTICAL DEFLECTOR AND THE OPTICAL DEFLECTION APPARATUS

(75) Inventors: Shinichi Shikii, Nara (JP); Keiji Sugiyama, Kyoto (JP); Katsuhiko Hayashi, Nara (JP)

(73) Assignee: PANASONIC CORPORATION, Osaka (JP)

( * ) Notice: Subject to any disclaimer, the term of this patent is extended or adjusted under 35 U.S.C. 154(b) by 803 days.

(21) Appl. No.: 13/701,851

(22) PCT Filed: Apr. 2, 2012

(86) PCT No.: PCT/JP2012/002290
§ 371 (c)(1),
(2), (4) Date: Dec. 4, 2012

(87) PCT Pub. No.: WO2012/140843
PCT Pub. Date: Oct. 18, 2012

(65) Prior Publication Data
US 2013/0077024 A1    Mar. 28, 2013

Related U.S. Application Data

(60) Provisional application No. 61/475,831, filed on Apr. 15, 2011.

(51) Int. Cl.
*G02F 1/1335*    (2006.01)
*G02B 26/08*    (2006.01)
(Continued)

(52) U.S. Cl.
CPC ..... *G02F 1/133553* (2013.01); *G02B 17/004* (2013.01); *G02B 26/0816* (2013.01);
(Continued)

(58) Field of Classification Search
None
See application file for complete search history.

(56) References Cited

U.S. PATENT DOCUMENTS 6,169,594 B1 * 1/2001 Aye .................. G02B 5/045
349/196
7,434,976 B2    10/2008 Sakurai et al.
(Continued)

FOREIGN PATENT DOCUMENTS

CN    1834754    9/2006
EP    1 293 822    3/2003
(Continued)

OTHER PUBLICATIONS

International Search Report issued Jul. 3, 2012 in International (PCT) Application No. PCT/JP2012/002290.
(Continued)

*Primary Examiner* — Lauren Nguyen
*Assistant Examiner* — Anthony G Quash
(74) *Attorney, Agent, or Firm* — Westerman, Lind & Ponack, L.L.P.

(57) ABSTRACT

An optical deflector which deflects incident light, includes an optical deflection element which deflects the incident light when a distribution of internal refraction indexes of the optical deflection element is modulated. The light incident on the optical deflection element is emitted from the optical deflection element after passing through the optical deflection element a plurality of times.

6 Claims, 13 Drawing Sheets

(51) Int. Cl.
*G02B 17/00* (2006.01)
*G02B 5/02* (2006.01)
*G02B 27/22* (2006.01)
*G02F 1/1333* (2006.01)
*G02F 1/29* (2006.01)

(52) U.S. Cl.
CPC ........ *G02B 5/0278* (2013.01); *G02B 27/2214* (2013.01); *G02F 1/133371* (2013.01); *G02F 1/29* (2013.01); *G02F 2001/291* (2013.01)

(56) References Cited

U.S. PATENT DOCUMENTS

| | | | |
|---|---|---|---|
| 7,580,186 | B2 | 8/2009 | Mather et al. |
| 2002/0012101 | A1* | 1/2002 | Takeuchi ............. H04N 9/3105 353/31 |
| 2004/0081392 | A1 | 4/2004 | Li et al. |
| 2005/0111100 | A1 | 5/2005 | Mather et al. |
| 2005/0111785 | A1 | 5/2005 | Zhao et al. |
| 2006/0209567 | A1 | 9/2006 | Sakurai et al. |
| 2008/0211977 | A1* | 9/2008 | Ijzerman ............ H04N 13/0402 349/15 |
| 2010/0149073 | A1* | 6/2010 | Chaum ............... G02B 27/0093 345/8 |
| 2010/0157026 | A1* | 6/2010 | Reichelt ............... G02B 26/005 348/51 |
| 2010/0177025 | A1* | 7/2010 | Nagata ................. G02B 6/0028 345/76 |
| 2010/0245717 | A1* | 9/2010 | Miyamoto ........... G02B 6/0051 349/65 |
| 2011/0058122 | A1* | 3/2011 | Shikii ....................... F21V 9/14 349/62 |
| 2011/0182050 | A1* | 7/2011 | Kanade .................... G02B 5/02 362/19 |

FOREIGN PATENT DOCUMENTS

| | | | | |
|---|---|---|---|---|
| JP | 7-98439 | 4/1995 | | |
| JP | 11-160794 | 6/1999 | | |
| JP | 11-271816 | 10/1999 | | |
| JP | 2002-523802 | 7/2002 | | |
| JP | 2005-78078 | 3/2005 | | |
| JP | 2008-64793 | 3/2008 | | |
| JP | 4367775 | 11/2009 | | |
| JP | 2010-529485 | 8/2010 | | |
| KR | 2003-0075321 | 9/2003 | | |
| KR | 10-2004-0105899 | * | 12/2004 | ......... G02F 1/13357 |
| WO | 00/11515 | 3/2000 | | |
| WO | 02/079871 | 10/2002 | | |
| WO | 2008/142156 | 11/2008 | | |

OTHER PUBLICATIONS

Chinese Office Action issued Jun. 26, 2015 in corresponding Chinese Patent Application No. 201280001649.4 (with English translation).

Machine translation of KR 2003-0075321, Sep. 2003.

European Search Report issued Apr. 7, 2014 for the corresponding European patent application No. 12771718.9 (in English).

European Patent Office Communication dated Apr. 18, 2016 in corresponding Application No. 12771718.9.

The Fourth Office Action issued Nov. 23, 2016, in corresponding European Application No. 12771718.9.

* cited by examiner

OPTICAL DEFLECTOR, OPTICAL DEFLECTION APPARATUS, AND LIQUID CRYSTAL DISPLAY APPARATUS USING THE OPTICAL DEFLECTOR AND THE OPTICAL DEFLECTION APPARATUS

This application claims benefit of U.S. provisional application 61/475,831, filed Apr. 15, 2011.

TECHNICAL FIELD

The present disclosure relates to optical deflectors and optical deflection apparatuses which deflect incident light, and liquid crystal display apparatuses using the optical deflectors and the optical deflection apparatuses.

BACKGROUND ART

Various optical deflectors which deflect incident light have conventionally been studied. Optical deflectors are devices indispensable to, for example, laser scanners used in laser printers or the like. Examples of conventional optical deflectors include polygon scanners, galvanometer scanners, and MEMS mirrors. However, since such polygon scanners, galvanometer scanners, MEMS mirrors, or the like include a mobile unit (mechanical mechanism) for moving parts, there is a problem in that a failure easily occurs. For this reason, there is demand for the development of optical deflectors capable of deflecting light without including a mobile unit.

In response to that demand, an optical deflector as disclosed in Patent Literature (PTL) 1 below has been proposed. This optical deflector does not include a mobile unit, and deflects light with use of the fact that the refractive indexes of liquid crystals are modulated by application of voltage. Through this, it is possible to reduce the occurrence of failures and achieve high reliability.

Now, a conventional optical deflector will be described with reference to FIGS. 14A and 14B. FIG. 14A is a cross-sectional view of a conventional optical deflector, and FIG. 14B is a cross-sectional view of the optical deflector taken along line A-A in FIG. 14A. An optical deflector 50 shown in FIGS. 14A and 14B includes an optical deflection element 501 and three pairs of electrodes 502a, 502b, and 502c provided in the periphery of the optical deflection element 501. The optical deflection element 501 includes a liquid crystal 503 having a triangular shape in cross section and a dielectric 504 having a shape complementary to that of the liquid crystal 503. The dielectric 504 is provided on the inclined face side of the liquid crystal 503, as a result of which the optical deflection element 501 as a whole is configured in a rectangular shape in cross section. The dielectric 504 may be made of, for example, a polymeric resin such as a plastic, or glass. The three pairs of electrodes 502a, 502b, and 502c are each provided such that the two electrodes face each other with the optical deflection element 501 therebetween.

Light is incident on the optical deflection element 501 as indicated by an arrow 505 in FIG. 14A. The refractive index of the liquid crystal 503 is modulated by application of voltage (including zero voltage) between each of the three pairs of electrodes 502a, 502b, and 502c, and the light incident on the optical deflection element 501 is deflected. When a refractive index NL of the liquid crystal 503 is higher than a refractive index ND of the dielectric 504, light is refracted in a direction indicated by an arrow 505h in FIG. 14A. When the refractive index NL of the liquid crystal 503 is lower than the refractive index ND of the dielectric 504, light is refracted in a direction indicated by an arrow 505m in FIG. 14A. In this way, the light deflected inside the optical deflection element 501 is emitted from the optical deflection element 501. When the refractive index NL of the liquid crystal 503 and the refractive index ND of the dielectric 504 are the same value, light travels in a straight direction indicated by an arrow 505s in FIG. 14A without being refracted.

The response speed of the optical deflection element 501 when deflecting light depends on the height of the liquid crystal 503. According to PTL 1, the liquid crystal 503 having a height of 20 μm or less achieves a response speed of 100 μsec or less, and the liquid crystal 503 having a height of 15 μm or less achieves a response speed of 30 μsec or less. Here, by changing the difference between the refractive index NL of the liquid crystal 503 and the refractive index ND of the dielectric 504 by approximately 0.2, light can be deflected at an angle of approximately 30 degrees.

Furthermore, PTL 2 below discloses a liquid crystal display apparatus which provides three dimensional (3D) images using the above optical deflector. FIG. 14C is a cross-sectional view of a conventional liquid crystal display apparatus. A liquid crystal display apparatus 60 in FIG. 14C includes an optical deflector 601, a light guide plate 602, a light source 603, a liquid crystal panel 604, a pair of stereo cameras 605a and 605b, and a control unit 606. The optical deflector 601 includes a plurality of the optical deflection elements 501 arranged horizontally. The control unit 606 controls the liquid crystal panel 604, the optical deflector 601, the light source 603, and the pair of stereo cameras 605a, and 605b. Light emitted from the light source 603 is incident on the lateral face of the light guide plate 602, propagates through the light guide plate 602, is directed upward in a substantially vertical direction by the prism shaped bottom of the light guide plate 602, and then is emitted from the top face of the light guide plate 602. The light, incident on the optical deflector 601 substantially vertically, is deflected at a different deflection angle for each optical deflection element 501 at predetermined timing, thereby being collected onto a right eye 607a of a viewer 607. In synchronization with the predetermined timing, the control unit 606 causes the liquid crystal panel 604 to display a right-eye image. After the above predetermined timing, light is deflected by the optical deflector 601 to be collected onto a left eye 607b of the viewer 607. In synchronization with this timing, the control unit 606 causes the liquid crystal panel 604 to display a left-eye image. By alternately switching between the images displayed on the liquid crystal panel 604 at a predetermined cycle (for example, 8.3 msec: 120 Hz), the viewer 607 perceives the images displayed on the liquid crystal panel 604 as 3D images.

In a case where the position of the viewer 607 shifts, the control unit 606 adjusts the angle of light deflected the deflector 601, based on the positions of the eyes 607a and 607b of the viewer 607 detected by the pair of stereo cameras 605a and 605b. As a result, it is possible to continuously provide right-eye images to the right eye 607a and left-eye images to the left eye 607b.

CITATION LIST

Patent Literature

[PTL 1] Japanese Unexamined Patent Publication Application No. 2002-523802
[PTL 2] Japanese Unexamined Patent Publication Application No. 7-98439
[PTL 3] Japanese Patent No. 4367775

SUMMARY OF INVENTION

Technical Problem

However, in the conventional liquid crystal display apparatus 60, the amount of the refractive index of the optical deflector 601 that can be modulated is small, and the light deflection angle is up to approximately 30 degrees. Hence, the viewer 607 needs to be positioned far from the liquid crystal panel 604. Furthermore, in a case where the position of the viewer 607 significantly shifts, light from the liquid crystal panel 604 cannot follow the movement of the viewer 607. As described above, the conventional liquid crystal display apparatus 60 provides a limited range (visual field) in which 3D images are viewable.

The present disclosure has been conceived to solve the conventional problem. The present disclosure has an object to provide an optical deflector and an optical deflection apparatus which allow greater light deflection angle. Another object is to provide a liquid crystal display apparatus which displays high-quality 3D images, with greater visual field where 3D images and the like are viewable and with reduced crosstalk.

Solution to Problem

In order to achieve the above objects, an optical deflector according to one aspect of the present disclosure deflects incident light and includes an optical deflection element which deflects the incident light when a distribution of internal refraction indexes of the optical deflection element is modulated, and the light incident on the optical deflection element is emitted from the optical deflection element after passing through the optical deflection element a plurality of times.

Advantageous Effects of Invention

The optical deflector and the optical deflection apparatus disclosed herein allows greater light deflection angle. Furthermore, the liquid crystal display apparatus disclosed herein provides a greater visual field in which 3D images and the like are viewable, and displays, on a liquid crystal panel, high-quality 3D images and the like with reduced crosstalk.

DESCRIPTION OF EMBODIMENTS

Background to Embodiments of the Present Disclosure

Prior to describing Embodiments, a description is given of the problems, found by the Inventors, of a conventional liquid crystal display apparatus. It is to be noted that the following description helps understanding the present disclosure, however, various conditions and the like described below do not limit the present disclosure.

Figure 15A:
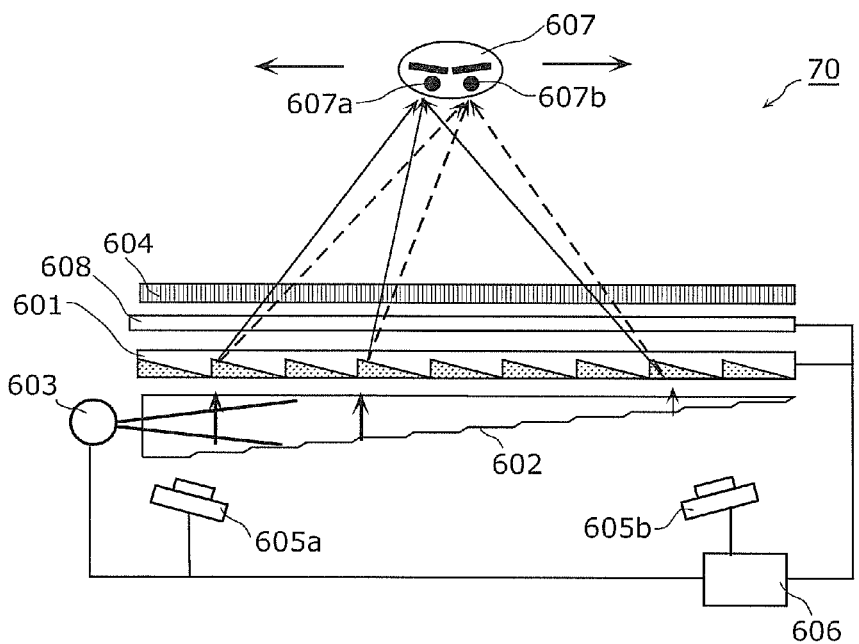
FIG. 15A is a cross-sectional view of a liquid crystal display apparatus including a lens array, according to a comparison example.

FIG. 15A is a cross-sectional view of a liquid crystal display apparatus including a lens array, according to a comparison example. A liquid crystal display apparatus 70 shown in FIG. 15A includes a double-layered lens array 608 between an optical deflector 601 and a liquid crystal panel 604. For example, the light deflection angle can be increased by using the double-layered lens array 608 as disclosed in PTL 3.

Figure 15B:
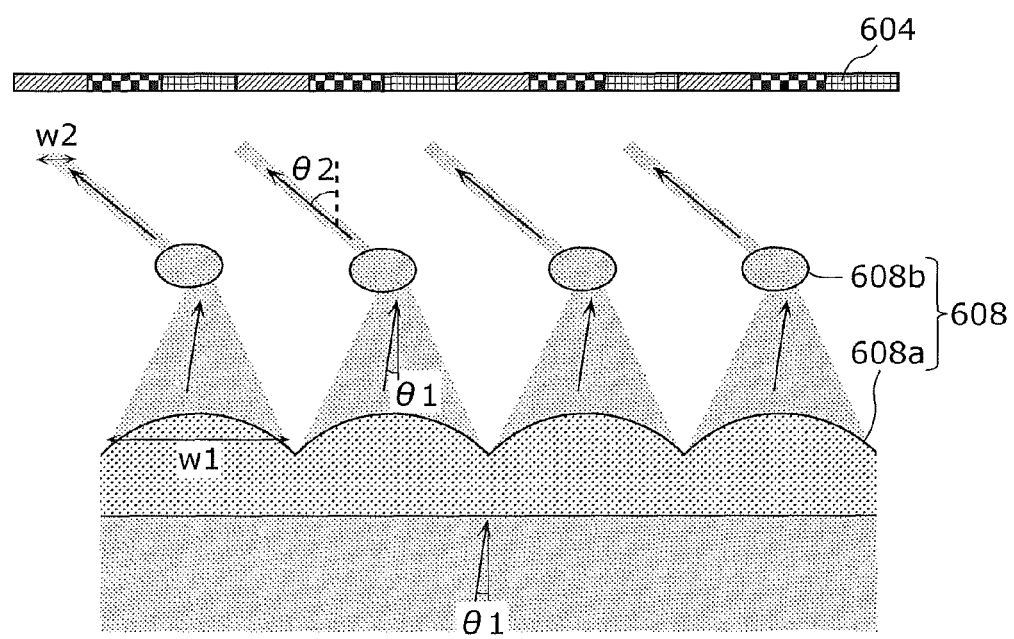
FIG. 15B is an enlarged cross-sectional view of the lens array shown in FIG. 15A.

However, the liquid crystal display apparatus 70 shown in FIG. 15A has a following problem. FIG. 15B is an enlarged cross-sectional view of the lens array shown in FIG. 15A. As shown in FIG. 15B, the lens array 608 includes beam reducers each of which includes two lenses 608$a$ and 608$b$. The diameter of beam (light), which is obtained after the light deflection angle is increased, generally decreases by a magnification factor of the deflection angle. For example, in the case of an optical system where the lens array 608 increases incident angle $\theta 1$ of beam to angle $\theta 2$ by $\theta 2/\theta 1$, beam diameter W2, which is obtained after the deflection angle is increased, decreases to $1/(\theta2/\theta1)$ of beam diameter W1 which is obtained before the light deflection angle is increased. Hence, excessive magnification factor of the deflection angle results in uneven illuminated area of the liquid crystal panel 604, as shown in FIG. 15B, including unilluminated liquid crystal pixels. Furthermore, in a case where the beam diameter W2 is too small, beam spreads due to diffraction, causing crosstalk which reduces image quality.

In order to solve such problems, an optical deflector according to one aspect of the present disclosure deflects incident light and includes an optical deflection element which deflects the incident light when a distribution of internal refraction indexes of the optical deflection element is modulated, and the light incident on the optical deflection element is emitted from the optical deflection element after passing through the optical deflection element a plurality of times.

According to the aspect, the deflection angle of light which passes through the same deflection element a plurality of times is, for example, approximately a few times greater than the deflection angle of light which passes through an optical deflection element only once. As a result, it is possible to increase the light deflection angle with a relatively-simple structure.

The liquid crystal display apparatus according to one aspect of the present disclosure includes: the optical deflector according to Claim 1; and a liquid crystal panel which is provided at one side of the optical deflector, and on which the light emitted from the optical deflector is incident, and the light emitted from the liquid crystal panel is alternately collected onto a right eye and a left eye of a viewer viewing the liquid crystal panel.

According to the aspect, the deflection angle of light emitted from the optical deflector can be increased, allowing a greater visual field in which 3D images and the like are viewable. Furthermore, it is possible to display high-quality 3D images and the like on a liquid crystal panel, with reduced crosstalk.

For example, it may be that the liquid crystal display apparatus according to one aspect of the present disclosure, further includes: a reflective plate which is provided at an other side of the optical deflector, and which specularly reflects light; and a light emitting unit which is provided between the liquid crystal panel and the optical deflector, and which emits light, and the light emitted from the light emitting unit passes through the optical deflector, is specularly reflected by the reflective plate, passes through the optical deflector again, and is incident on the liquid crystal panel.

According to the aspect, light is emitted from the optical deflector after passing through the same optical deflector a plurality of times, and thus, the deflection angle can be increased.

For example, it may be that the liquid crystal display apparatus according to one aspect of the present disclosure further includes an optical element which is provided between the light emitting unit and the reflective plate, and which changes a traveling direction of light.

According to the aspect, by deflecting light using an optical element, the light can be deflected toward the right eye and the left eye of the viewer, with a small internal refractive index distribution of the optical deflection element. As a result, for example, it is possible to achieve a liquid crystal display apparatus which consumes lower power.

For example, in the liquid crystal display apparatus according to one aspect of the present disclosure, the optical element may be a prism sheet or a Fresnel sheet.

According to the aspect, it is possible that the optical element is formed of a prism sheet or a Fresnel sheet.

An optical deflection apparatus according to one aspect of the present disclosure includes: the optical deflector according to Claim 1; a polarizing reflective sheet which is provided at one side of the optical deflector, which reflects light having a first polarization direction, and which transmits light having a second polarization direction orthogonal to the first polarization direction; a reflective plate which is provided at an other side of the optical deflector, and which specularly reflects light; a $\lambda/4$ plate provided between the optical deflector and the reflective plate; and a light emitting unit which is provided between the polarizing reflective sheet and the $\lambda/4$ plate, and which emits, toward the polarizing reflective sheet, the light having the first polarization direction.

According to the aspect, the deflection angle of light which passes through the same optical deflector a plurality of times is, for example, approximately a few times greater than the deflection angle of light which passes through the optical deflector only once. As a result, it is possible to increase the light deflection angle with a relatively-simple structure.

A liquid crystal display apparatus according to one aspect of the present disclosure includes the optical deflection apparatus according to Claim 6; and a liquid crystal panel on which light emitted from the optical deflection apparatus is incident, and the light emitted from the light emitting unit of the optical deflection apparatus passes through the optical deflector of the optical deflection apparatus a plurality of times, is emitted from the polarizing reflective sheet of the optical deflection apparatus, and is incident on the liquid crystal panel, and the light emitted from the liquid crystal panel is alternately collected onto a right eye and a left eye of a viewer viewing the liquid crystal panel.

According to the aspect, the deflection angle of light emitted from the optical deflector can be increased, allowing a greater visual field in which 3D images and the like are viewable. Furthermore, it is possible to display high-quality 3D images and the like on a liquid crystal panel, with reduced crosstalk.

For example, in the liquid crystal display apparatus according to one aspect of the present disclosure, it may be that the light emitting unit is capable of switching a polarization direction of the light emitted from the light emitting unit between the first polarization direction and the second polarization direction orthogonal to the first polarization direction.

According to the aspect, a viewer which is capable of viewing 3D images and the like displayed on the display panel can be switched appropriately between a plurality of viewers.

For example, in the liquid crystal display apparatus according to one aspect of the present invention, it may be that a polarization direction of the light emitted from the light emitting unit includes a polarization component of the first polarization direction and a polarization component of the second polarization direction orthogonal to the first polarization direction.

According to the aspect, a plurality of viewers can concurrently view 3D images and the like displayed on the liquid crystal panel.

For example, in the liquid crystal display apparatus according to one aspect of the present disclosure, it may be that the optical deflector includes: a first optical deflector provided between the light emitting unit and the polarizing reflective sheet; and a second optical deflector provided between the light emitting unit and the λ/4 plate of the optical deflection apparatus.

According to the aspect, even in a case where a plurality of viewers are located at different positions, light can be deflected independently toward each of the viewers.

For example, the liquid crystal display apparatus according to one aspect of the present disclosure, may further include an optical element which is provided between the reflective plate of the optical deflection apparatus and the light emitting unit, and which changes a traveling direction of light.

According to the aspect, by deflecting light using an optical element, the light can be deflected toward the right eye and the left eye of the viewer with a small internal refractive index distribution of the optical deflection element. As a result, for example, it is possible to achieve a liquid crystal display apparatus which consumes lower power.

For example, in the liquid crystal display apparatus according to one aspect of the present disclosure, the optical element may be a prism sheet or a Fresnel sheet.

According to the aspect, it is possible that the optical element is formed of a prism sheet or a Fresnel sheet.

For example, in the liquid crystal display apparatus according to one aspect of the present invention, it may be that the optical element is an active optical element which is capable of modulating a collection point of the light emitted from the liquid crystal panel, according to movement of the right eye and the left eye of the viewer.

According to the aspect, it is possible that the optical deflector deflects light toward the right eye and the left eye of the viewer and the active optical element follows the light collection point moved along with the movement of the right eye and the left eye of the viewer. As a result, it is possible to achieve a liquid crystal display apparatus which provides a greater visual field, and which allows the light collection point to be easily followed even in a case where the position of the viewer shifts.

For example, it may be that the liquid crystal display apparatus according to one aspect of the present invention, further includes a diffuser panel provided between the optical deflection apparatus and the liquid crystal panel, and the diffuser panel is switchable between a diffusion state where light is diffused and a non-diffusion state where light is transmitted without diffusion.

According to the aspect, it is possible to achieve a liquid crystal display apparatus which is switchable between 2D display and 3D display or privacy display.

An optical deflection apparatus according to one aspect of the present disclosure, includes the optical deflector according to Claim 1; a reflective plate which is provided at one side of the optical deflector, and which specularly reflects light; a λ/4 plate provided between the optical deflector and the reflective plate; a polarizing reflective sheet which is provided at an other side of the optical deflector, and which reflects light having a first polarization direction and transmits light having a second polarization direction orthogonal to the first polarization direction; and a light emitting unit which is provided between the optical deflector and the polarizing reflective sheet, and which emits, toward the optical deflector, the light having the second polarization direction.

According to the aspect, the deflection angle of light which passes through the same optical deflector a plurality of times is, for example, approximately a few times greater than the deflection angle of light which passes through the optical deflector only once. As a result, it is possible to increase the light deflection angle with a relatively-simple structure.

A liquid crystal display apparatus according to one aspect of the present disclosure includes the optical deflection apparatus according to Claim 15; and a liquid crystal panel on which light emitted from the optical deflection apparatus is incident. The light emitted from the light emitting unit of the optical deflection apparatus passes through the optical deflector of the optical deflection apparatus a plurality of times, is emitted from the polarizing reflective sheet of the optical deflection apparatus, and is incident on the liquid crystal panel, and the light emitted from the liquid crystal panel is alternately collected onto a right eye and a left eye of a viewer viewing the liquid crystal panel.

According to the aspect, the deflection angle of light emitted from the optical deflection apparatus can be increased, allowing a greater visual field in which 3D images and the like are viewable. Furthermore, it is possible to display high-quality 3D images and the like on a liquid crystal panel, with reduced crosstalk.

For example, in the liquid crystal display apparatus according to one aspect of the present disclosure, it may be that the light emitting unit is capable of switching a polarization direction of the light emitted from the light emitting unit between the first polarization direction and the second polarization direction orthogonal to the first polarization direction.

According to the aspect, a viewer who is capable of viewing 3D images and the like displayed on the liquid crystal panel can be switched appropriately between a plurality of viewers.

For example, in the liquid crystal display apparatus according to one aspect of the present invention, it may be that a polarization direction of the light emitted from the light emitting unit includes a polarization component of the first polarization direction and a polarization component of the second polarization direction orthogonal to the first polarization direction.

According to the aspect, a plurality of viewers can concurrently view 3D images and the like displayed on the liquid crystal panel.

For example, it may be that the liquid crystal display apparatus according to one aspect of the present invention, further includes a diffuser panel provided between the optical deflection apparatus and the liquid crystal panel, and the diffuser panel is switchable between a diffusion state where light is diffused and a non-diffusion state where light is transmitted without diffusion.

According to the aspect, it is possible to achieve a liquid crystal display apparatus which is switchable between 2D display and 3D display or privacy display.

For example, the liquid crystal display apparatus according to one aspect of the present disclosure, may further include an optical element which is provided between the reflective plate of the optical deflection apparatus and the light emitting unit, and which changes a traveling direction of light.

According to the aspect, by deflecting light using an optical element, the light can be deflected toward the right eye and the left eye of the viewer with a small internal refractive index distribution of the optical deflection element. As a result, for example, it is possible to achieve a liquid crystal display apparatus which consumes lower power.

For example, in the liquid crystal display apparatus according to one aspect of the present disclosure, the optical element may be a prism sheet or a Fresnel sheet.

With this, it is possible that the optical element is formed of a prism sheet or a Fresnel sheet.

EMBODIMENTS

Hereinafter, detailed descriptions are given of embodiments of the present disclosure, referring to the accompanying Drawings. Each of the embodiments described below shows a general or specific example. The numerical values, shapes, materials, structural elements, the arrangement of the structural elements, steps, the processing order of the steps etc. shown in the following embodiments are mere examples, and therefore do not limit the scope of the appended Claims and their equivalents. The present disclosure is defined by the appended claims. Therefore, among the structural elements in the following embodiments, structural elements not recited in any one of the independent claims are described as arbitrary structural elements.

Embodiment 1

Structure of Optical Deflector

Figure 1A:
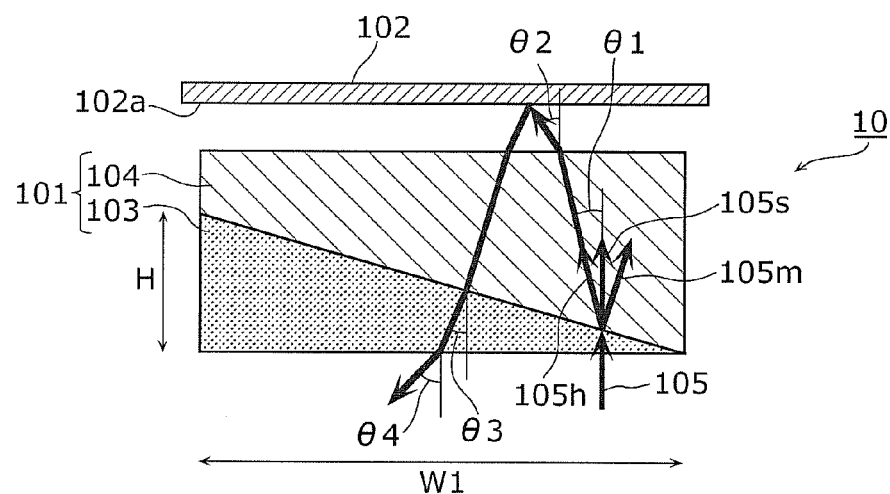
FIG. 1A is a cross-sectional view of an optical deflector according to Embodiment 1.

FIG. 1A is a cross-sectional view of an optical deflector according to Embodiment 1. As shown in FIG. 1A, an optical deflector 10 according to Embodiment 1 includes an optical deflection element 101. At one side of the optical deflection element 101, a reflective plate 102 is provided. The following describes the structure of the optical deflection element 101 and the reflective plate 102.

The optical deflection element 101 includes a liquid crystal 103 having a triangular shape in cross section and a dielectric 104 having a shape complementary to that of the liquid crystal 103. The dielectric 104 is provided on the inclined face side of the liquid crystal 103. As a result, the optical deflection element 101 has a rectangular shape in cross section as a whole. The dielectric 104 may be made of, for example, a polymeric resin such as a plastic, or glass.

Furthermore, a pair of electrodes (not shown) is provided for applying voltage to the liquid crystal 103 of the optical deflection element 101. The pair of electrodes is provided such that the two electrodes face each other with the optical deflection element 101 therebetween. By controlling the voltage applied between the pair of electrodes, a refractive index NL of the liquid crystal 103 can be modulated at a predetermined modulation range. For example, when a first voltage is applied between the pair of electrodes, the refractive index NL of the liquid crystal 103 is higher than the refractive index ND of the dielectric 104. When a second voltage different from the first voltage is applied between the pair of electrodes, the refractive index NL of the liquid crystal 103 is lower than the refractive index ND of the dielectric 104. When a third voltage, which is different from the first voltage and the second voltage, is applied between the pair of electrodes, the refractive index NL of the liquid crystal 103 is the same value as the refractive index ND of the dielectric 104. In such a manner, the internal refractive index distribution of the optical deflection element 101 is modulated. It is to be noted that each of the first voltage, the second voltage, and the third voltage has a certain level of voltage, but may be a zero voltage.

The reflective plate 102 is provided facing the dielectric 104 with a space therebetween. The surface of the reflective plate 102 which faces the dielectric 104 has, for example, a mirrored reflective plane 102a. The reflective plane 102a has a function to specularly reflect light. As described later, light incident on the optical deflector 101 passes through the optical deflector 101, is emitted from the optical deflector 101, is reflected by the reflective plate 102, and then is incident on the optical deflector 101 again. The reflective plate 102 may be included in the optical deflector 10 together with the optical deflection element 101.

Next, a description is given of a method for deflecting light performed by the optical deflector 10 according to Embodiment 1. A light source (not shown) is provided on the light incident side of the optical deflector 10. As indicated by an arrow 105 in FIG. 1A, light emitted from the light source is incident on the incidence end face (lower face in FIG. 1A) of the liquid crystal 103 in a substantially vertical direction.

For example, when the third voltage is applied between the pair of electrodes, the refractive index NL of the liquid crystal 103 is the same value as that of the refractive index ND of the dielectric 104. As a result, the light incident on the incidence end face of the liquid crystal 103 travels straight as indicated by an arrow 105s in FIG. 1A without being refracted at the interface between the liquid crystal 103 and the dielectric 104. For example, when the first voltage is applied between the pair of electrodes, the refractive index NL of the liquid crystal 103 is higher than the refractive index ND of the dielectric 104. As a result, the light is refracted at the interface between the liquid crystal 103 and the dielectric 104, as indicated by an arrow 105h in FIG. 1A. Furthermore, for example, when the second voltage is applied between the pair of electrodes, the refractive index NL of the liquid crystal 103 is lower than the refractive index ND of the dielectric 104. As a result, the light is refracted at the interface between the liquid crystal 103 and the dielectric 104, as indicated by an arrow 105m in FIG. 1A.

Here, a description is given of a case where the refractive index NL of the liquid crystal 103 is higher than the refractive index ND of the dielectric 104. For example, in a case where the liquid crystal 103 has a refractive index NL of 1.5, a height H of 15 μm, and a width W1 of 50 μm, and the dielectric 104 has a refractive index ND of 1.4, light 11 incident on the incidence end face of the liquid crystal 103 substantially vertically is refracted at the interface between the liquid crystal 103 and the dielectric 104 at an angle of $\theta 1=1.2$ degrees. Then, the light travels through the dielectric 104, and is emitted into the air at an angle of $\theta 2=1.7$ degrees. The light which is emitted into the air is specularly reflected by the reflective plane 102a of the reflective plate 102, is incident on the dielectric 104 again at an angle of $\theta 2=1.7$ degrees and then travels through the dielectric 104. After that, the light is refracted at the interface between the dielectric 104 and the liquid crystal 103 at an angle of $\theta 3=2.3$ degrees, and is emitted into the air at an angle of $\theta 4=3.4$ degrees, that is, the angle twice as large as the angle $\theta 2$.

Hence, the light deflection angle of the optical deflector 10 according to Embodiment 1 is the angle $\theta 4=3.4$ degrees. The light deflection angle refers to an angle at which light finally emitted from the optical deflector 10 is deflected relative to the vertical direction (up-down direction in FIG. 1A). Furthermore, each of the angles $\theta 1$ to $\theta 4$ is an angle relative to the vertical direction.

As described, with the optical deflector 10 according to Embodiment 1, light incident on the optical deflection element 101 passes through the optical deflection element 101 twice and then is emitted from the optical deflection element 101. The deflection angle $\theta 4$ of light which passes through the optical deflection element 101 twice is twice as large as the deflection angle θ2 of light which passes through the optical deflection element 101 only once. Hence, the optical deflector 10 according to Embodiment 1 is capable of doubling the light deflection angle with a relatively simple structure.

In a case where the refractive index NL of the liquid crystal 103 is lower than the refractive index ND of the dielectric 104, too, the light deflection angle θ4 can be increased in the similar manner to above. Furthermore, in a case where the reflective plate 102 is provided facing the liquid crystal 103, too, the light deflection angle θ4 can be increased in the similar manner to above.

The optical deflector 10 according to Embodiment 1 has such a structure where light passes through the optical deflection element 101 twice; however, it is easily understood that allowing light to pass through the optical deflection element 101 three times or more further increases the light deflection angle.

The optical deflector 10 according to Embodiment 1 uses the reflective plate 102 to allow light to pass through the optical deflection element 101 twice; however, any elements other than the reflective plate 102 may be used.

In this description, the term "pass through" refers to that light incident on the optical deflection element 101 travels through the optical deflection element 101, and then is emitted from the optical deflection element 101.

(Structure of Liquid Crystal Display Apparatus)

Figure 1B:
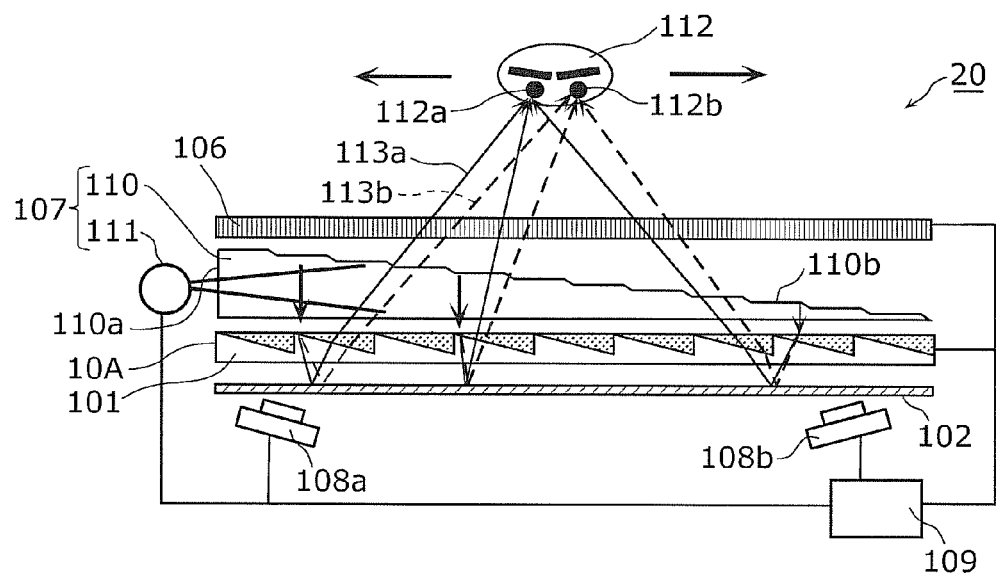
FIG. 1B is a cross-sectional view of a liquid crystal display apparatus according to Embodiment 1.

FIG. 1B is a cross-sectional view of a liquid crystal display apparatus according to Embodiment 1. As shown in FIG. 1B, a liquid crystal display apparatus 20 according to Embodiment 1 includes an optical deflector 10A, a liquid crystal panel 106, a light emitting unit 107, a reflective plate 102, a pair of stereo cameras 108a and 108b, and a control unit 109. The liquid crystal display apparatus 20 according to Embodiment 1 is, for example, a tablet 3D display which allows viewers to view 3D images with their naked eyes without wearing dedicated glasses.

The optical deflector 10A includes an array of the optical deflection elements 101. Each of the optical deflection elements 101 has a structure similar to that of the optical deflection element 101 in FIG. 1A. As a result, the optical deflector 10A has a panel-like shape as a whole. The optical deflector 10A two-dimensionally deflects incident light on each in-plane area of the optical deflector 10A; and thus, incident light can be collected to a predetermined light collection point in a three-dimensional space.

The liquid crystal panel 106 is provided at one side of the optical deflector 10A. A plurality of liquid crystal pixels are arranged in a matrix in a display region of the liquid crystal panel 106.

The light emitting unit 107 is provided between the optical deflector 10A and the liquid crystal panel 106. The light emitting unit 107 includes a light guide plate 110 and a light source 111 which is provided facing one lateral surface 110a of the light guide plate 110. The light guide plate 110 has a top surface shaped like an uneven prism 110b. The light source 111 emits light toward the one lateral surface 110a of the light guide plate 110.

The reflective plate 102 is provided at the other side of the optical deflector 10A. The reflective plate 102 has a structure similar to that of the reflective plate 102 in FIG. 1A.

The pair of stereo cameras 108a and 108b respectively capture images of a right eye 112a and a left eye 112b of a viewer 112 viewing the liquid crystal display apparatus 20.

The control unit 109 controls voltage applied to liquid crystals 103 in the optical deflection elements 101, based on image signals transmitted from the stereo cameras 108a and 108b. Furthermore, the control unit 109 controls images to be displayed on the liquid crystal panel 106, and also controls lighting of the light source 111.

Next, a description is given of a mechanism of operations performed by the liquid crystal display apparatus 20 according to Embodiment 1. The pair of stereo cameras 108a and 108b respectively capture images of the eyes 112a and 112b of the viewer 112 viewing the liquid crystal panel 106. The control unit 109 detects the positions of the eyes 112a and 112b of the viewer 112, based on the difference between the images captured by the stereo cameras 108a and 108b. The control unit 109 controls voltage to be applied to respective liquid crystal 103 in the optical deflection elements 101, based on the result of detection, to modulate the refractive index NL of the liquid crystal 103.

Light emitted from the light source 111 is incident on the one lateral surface 110a of the light guide plate 110, propagates through the light guide plate 110, is bent substantially vertically by the prism 110b formed on the top surface of the light guide plate 110, and then is emitted from the bottom surface of the light guide plate 110. After that, the light passes through the optical deflector 10A, is specularly reflected by the reflective plate 102, and then passes through the optical deflector 10A again. The light emitted from the optical deflector 10A passes through the light guide plate 110 and the liquid crystal panel 106, and is emitted to outside of the liquid crystal display apparatus 20. At this time, the liquid crystal panel 106 is illuminated with the light emitted from the optical deflector 10A, forming an image on the liquid crystal panel 106.

From the start of the illumination of the light source 111 till a predetermined time elapses, the control unit 109 modulates the refractive index NL of each liquid crystal 103 in the optical deflection elements 101. As a result, the light emitted from the bottom surface of the light guide plate 110 is deflected by the optical deflector 10A toward the right eye 112a of the viewer 112 as indicated by a solid arrow 113a in FIG. 1B. The light emitted from the optical deflector 10A is collected onto the right eye 112a of the viewer 112. The control unit 109 causes the liquid crystal panel 106 to display a right-eye image at the time at which the light is deflected toward the right eye 112a of the viewer 112.

After the above predetermined time has elapsed, the control unit 109 modulates the refractive index NL of each liquid crystal 103 in the optical deflection elements 101. As a result, the light emitted from the bottom surface of the light guide plate 110 is deflected by the optical deflector 10A toward the left eye 112b of the viewer 112 as indicated by a dashed arrow 113b in FIG. 1B. The light emitted from the optical deflector 10A is collected onto the left eye 112b of the viewer 112. The control unit 109 causes the liquid crystal panel 106 to display a left-eye image at the time at which the light is deflected toward the left eye 112b of the viewer 112.

In this way, the control unit 109 switches the angle of light deflected by the optical deflector 10A in time series. Accordingly, the light emitted from the optical deflector 10A is alternately collected onto the right eye 112a and the left eye 112b of the viewer 112 in time series. A right-eye image is displayed on the liquid crystal panel 106 at the time when the light is deflected toward the right eye 112a, and a left-eye image is displayed on the liquid crystal panel 106 at the time when the light is deflected toward the left eye 112b of the viewer 112. As a result, the viewer 112 can recognize a 3D image.

In the liquid crystal display apparatus 20 according to Embodiment 1, in the manner similar to above, light incident on the optical deflector 10A passes through the optical deflector 10A, is specularly reflected by the reflective plate 102, passes through the optical deflector 10A again, and is emitted from the optical deflector 10A; and thus, it is possible to increase the light deflection angle. Accordingly, it is possible to achieve the liquid crystal display apparatus 20 which provides a greater visual field.

Furthermore, in a case where a right-eye image and a left-eye image that are displayed on the liquid crystal panel 106 are the same image, the viewer 112 recognizes the images as 2D images, but people other than the viewer 112 cannot recognize the images displayed on the liquid crystal panel 106. Thus, in such a case, the liquid crystal display apparatus 20 functions as a privacy display.

It is to be noted that in Embodiment 1, the top surface of the light guide plate 110 has a shape of the prism 110b; however, the present disclosure is not limited to such a structure. As another alternative, the light emitting unit 107 may have an element other than the light guide plate 110.

Embodiment 2

Figure 2:
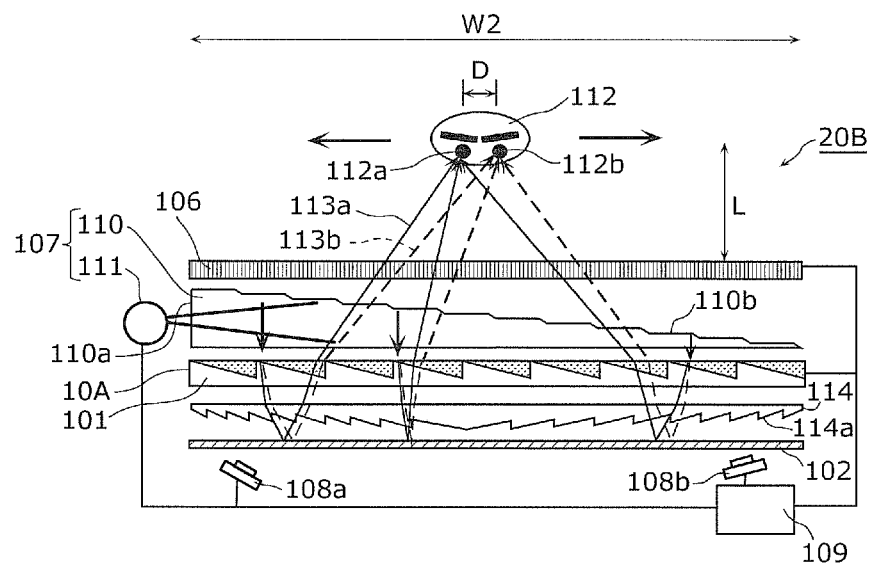
FIG. 2 is a cross-sectional view of a liquid crystal display apparatus according to Embodiment 2.

FIG. 2 is a cross-sectional view of a liquid crystal display apparatus according to Embodiment 2. As shown in FIG. 2, a liquid crystal display apparatus 20B according to Embodiment 2 includes a prism sheet 114 (which constitutes an optical element) between an optical deflector 10A and a reflective plate 102. The other elements included in the liquid crystal display apparatus 20B are similar to those included in the liquid crystal display apparatus 20 according to Embodiment 1.

Light emitted from the bottom surface of a light guide plate 110 passes through the optical deflector 10A and the prism sheet 114, is specularly reflected by the reflective plate 102, and passes through the prism sheet 114 and the optical deflector 10A again. The light emitted from the optical deflector 10A passes through the light guide plate 110 and a liquid crystal panel 106, and is emitted to outside of the liquid crystal display apparatus 20B.

The prism sheet 114 includes a plurality of prism portions 114a. The angle of each prism portion 114a is set in such a manner that light is collected onto an intermediate position between a right eye 112a and a left eye 112b of a viewer 112 when the viewer 112 is located at a most appropriate position for viewing 3D images in a state where, for example, the refractive index NL of a liquid crystal 103 and the refractive index ND of a dielectric 104 are the same value. Here, the most appropriate position refers to, for example, a position that is vertically distant from the center of the liquid crystal panel 160 by distant L.

Here, a description is given of an example where light is alternately deflected toward the right eye 112a and the left eye 112b of the viewer 112 when the distance L is 300 mm, the width W2 of the liquid crystal panel 106 is 200 mm, and the distance D between the right eye 112a and the left eye 112b of the viewer 112 is 60 mm. In a case where the prism sheet 114 is not included, it is necessary to set the light deflection angle to approximately 13 degrees to deflect light from, for example, one end of the liquid crystal panel 106 (left end in FIG. 2) toward the right eye 112a of the viewer 112. Furthermore, it is necessary to set the light deflection angle to approximately 23 degrees to deflect light from one end of the liquid crystal panel 106 toward the left eye 112b of the viewer 112. For example, in the case of the optical deflector 10A where the liquid crystal 103 has a height H of 15 μm and a width W1 of 50 μm, when the difference between the refractive index NL of the liquid crystal 103 and the refractive index ND of the dielectric 104 is 0.1, light is deflected at an angle of approximately 5.2 degrees. Hence, it is necessary to set the difference between the refractive index NL of the liquid crystal 103 and the refractive index ND of the dielectric 104 to 0.45, to deflect light at an angle of approximately 23 degrees. As another alternative, the height of the optical deflection elements 101 included in the optical deflector 10A needs to be increased.

On the other hand, in a case where the liquid crystal display apparatus 20B includes the prism sheet 114 as in Embodiment 2, light is deflected by the prism sheet 114 toward the intermediate position between the right eye 112a and the left eye 112b of the viewer 112, with the difference between the refractive index NL of the liquid crystal 103 and the refractive index ND of the dielectric 104 being 0. Thus, for example, light emitted from one end of the liquid crystal panel 106 is deflected at an angle of approximately 18 degrees toward the intermediate position between the right eye 112a and the left eye 112b of the viewer 112, with the difference between the refractive index NL of the liquid crystal 103 and the refractive index ND of the dielectric 104 being 0. In this state, it is possible to deflect light toward the right eye 112a and the left eye 112b of the viewer 112 by setting the difference between the refractive index NL of the liquid crystal 103 and the refractive index ND of the dielectric 104 to ±0.1 and modulating the angle of light deflected by the optical deflector 10A by approximately ±5 degrees.

Accordingly, the liquid crystal display apparatus 20B according to Embodiment 2 can deflect light toward the right eye 112a and the left eye 112b of the viewer 112, with the small difference between the refractive index NL of the liquid crystal 103 and the refractive index ND of the dielectric 104, or with the small height of the optical deflection elements 101 included in the optical deflector 10A. Furthermore, the difference between the refractive index NL of the liquid crystal 103 and the refractive index ND of the dielectric 104 depends on the value of voltage applied to the liquid crystal 103; and thus, smaller difference between the refractive indexes leads to lower voltage applied to the liquid crystal 103. As a result, it is possible to achieve the liquid crystal display apparatus 20B which consumes lower power. Furthermore, small height of the optical deflection elements 101 included in the optical deflector 10A leads to the liquid crystal display apparatus 20B with excellent processing characteristics.

Note that in Embodiment 2, the prism sheet 114 is used as an optical element; however, the present disclosure is not limited to this. For example, a Fresnel sheet may be used as an optical element.

Embodiment 3

Figure 3:
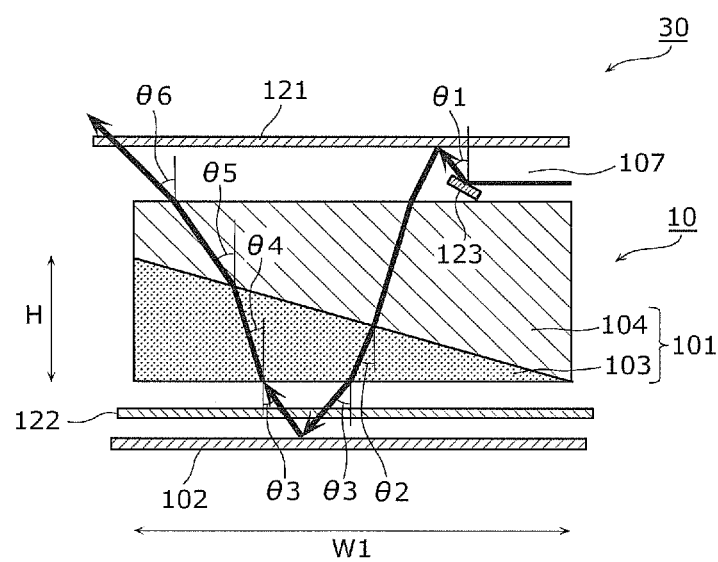
FIG. 3 is a cross-sectional view of an optical deflection apparatus according to Embodiment 3.

FIG. 3 is a cross-sectional view of an optical deflection apparatus according to Embodiment 3. As shown in FIG. 3, an optical deflection apparatus 30 according to Embodiment 3 includes an optical deflector 10, a polarizing reflective sheet 121, a λ/4 plate 122, a light emitting unit 107, and a reflective plate 102.

In the similar manner to Embodiment 1, the optical deflector 10 includes an optical deflection element 101 having a liquid crystal 103 and a dielectric 104.

The polarizing reflective sheet 121 is provided at one side of the optical deflector 10, that is, at the side closer to the dielectric 104. The polarizing reflective sheet 121 is a sheet which reflects light having a first polarization direction (for example, a direction vertical relative to the sheet of FIG. 3), and which transmits light having a second polarization direction (for example, an in-plane direction in FIG. 3) perpendicular to the first deflection direction.

The reflective plate 102 is provided at the other side of the optical deflector 10, that is, at the side closer to the crystal 103. The reflective plate 102 has the similar functions to those of the reflective plate 102 according to Embodiment 1.

The λ/4 plate 122 is provided between the optical deflector 10 and the reflective plate 102. The λ/4 plate 122 is a wave plate which has a function to convert linear polarization with a given wavelength into circular polarization (or convert circular polarization into linear polarization), and has a function to generate phase difference of ¼ of wavelength λ (that is, phase difference of 90 degrees) between linear polarization which oscillate in a direction vertical to each other.

The light emitting unit 107 is provided between the optical deflector 10 and the polarizing reflective sheet 121. The light emitting unit 107 includes a light source (not shown) and a reflective plate 123. Light emitted from the light source is specularly reflected by the reflective plate 123, and then is emitted toward the polarizing reflective sheet 121. The light emitted toward the polarizing reflective sheet 121 has a first polarization direction.

Next, a description is given of a method for deflecting light performed by the optical deflection apparatus 30 according to Embodiment 3. For example, a description is given of a case where the liquid crystal 103 has a refractive index NL of 1.5, a height H of 15 μm, a width W1 of 50 μm, and the dielectric 104 has a refractive index ND of 1.4. Since light, incident on the polarizing reflective sheet 121 from the reflective plate 123 at an angle of, for example, θ1=1.7 degrees, has a first polarization direction, the light is reflected by the polarizing reflective sheet 121. The light reflected by the polarizing reflective sheet 121 is incident on the dielectric 104 of the optical deflection element 101, travels through the dielectric 104, and is refracted at the interface between the dielectric 104 and the liquid crystal 103 at an angle of, for example, θ2=2.3 degrees. After that, the light travels through the liquid crystal 103, and is emitted into the air at an angle of, for example, θ3=3.4 degrees. The light emitted into the air is converted from linear polarization into circular polarization by passing through the λ/4 plate 122, and is converted from circular polarization into linear polarization by being specularly reflected by the reflective plate 102 and then passing through the λ/4 plate 122 again. The light emitted from the λ/4 plate 122 is incident on the liquid crystal 103 of the optical deflection element 101 again at an angle of, for example, θ3=3.4 degrees, with being polarized in the second polarization direction.

After that, the light is refracted at the interface between the air and the liquid crystal 103 at an angle of θ4=2.3 degrees, travels through the liquid crystal 103, and is refracted at the interface between the liquid crystal 103 and the dielectric 104 at an angle of, for example, θ5=3.7 degrees. The light traveled through the dielectric 104 is emitted from the dielectric 104 at an angle of, for example, θ6=5.2 degrees, and then is incident on the polarizing reflective sheet 121. Since the light incident on the polarizing reflective sheet 121 has a second polarization direction, the light passes through the polarizing reflective sheet 121, and is emitted to outside of the optical deflection apparatus 30. Hence, the angle of light deflected by the optical deflection apparatus 30 according to Embodiment 3 is the angle θ6=5.2 degrees, that is, the angle approximately three times as large as the angle θ1. Furthermore, each of the angles θ1 to θ6 is an angle relative to the vertical direction.

As described, according to the optical deflection apparatus 30 according to Embodiment 3, light incident on the optical deflector 10 is emitted from the optical deflector 10 after passing through the optical deflector 10 twice. Accordingly, it is possible to further increase the light deflection angle with a simple structure.

Embodiment 4

Structure of Light Deflection Apparatus

Figure 4A:
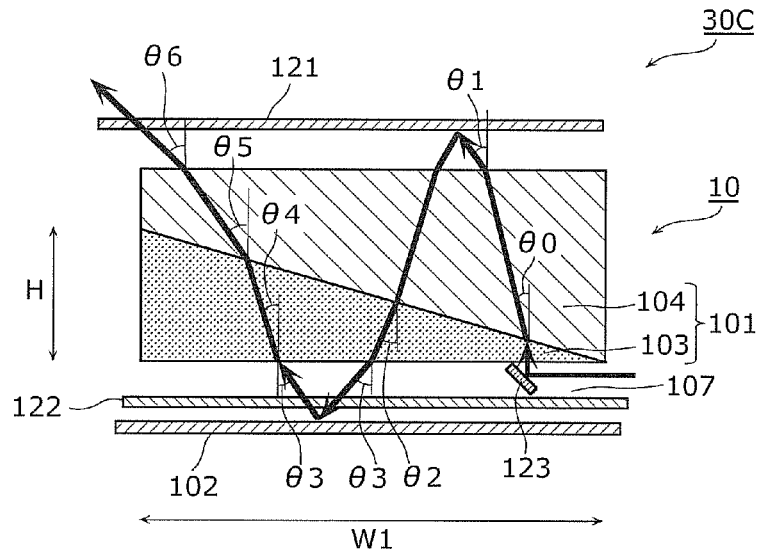
FIG. 4A is a cross-sectional view of an optical deflection apparatus according to Embodiment 4.

FIG. 4A is a cross-sectional view of an optical deflection apparatus according to Embodiment 4. As shown in FIG. 4A, an optical deflection apparatus 30C according to Embodiment 4 includes a light emitting unit 107 between an optical deflector 10 and a λ/4 plate 122. Light emitted from a light source (not shown) has a first polarization direction, and is emitted toward the optical deflector 10 after being specularly reflected by the reflective plate 123. The other elements included in the optical deflection apparatus 30C are similar to those included in the optical deflection apparatus 30 according to Embodiment 3.

Next, a description is given of a method for deflecting light performed by the optical deflection apparatus 30C according to Embodiment 4. A description is given of an example where a liquid crystal 103 has a refractive index NL of 1.5, a height H of 15 μm, and a width W1 of 50 μm, and a dielectric 104 has a refractive index ND of 1.4. Light incident on the crystal 103 of the optical deflector 10 from the reflective plate 123 is refracted at the interface between the liquid crystal 103 and the dielectric 104 at an angle of, for example, θ0=1.2 degrees. Then, the light travels through the dielectric 104, and is emitted from the dielectric 104 at angle of, for example, θ1=1.7 degrees. After that, the light passes through the optical deflector 10 along the path similar to that in Embodiment 3, and is emitted from the dielectric 104 at an angle of, for example, θ6=5.2 degrees. Hence, the angle of light deflected by the optical deflection apparatus 30C according to Embodiment 4 is the angle θ6=5.2 degrees, that is, the angle approximately three times as large as the angle θ1. Furthermore, each of the angles θ0 to θ6 is an angle relative to the vertical direction.

As described, in the optical deflection apparatus 30C according to Embodiment 4, light incident on the optical deflector 10 is emitted from the optical deflector 10 after passing through the optical deflector 10 three times. Accordingly, it is possible to further increase the light deflection angle with a simple structure, in the similar manner to Embodiment 3.

(Structure of Liquid Crystal Display Apparatus)

Figure 4B:
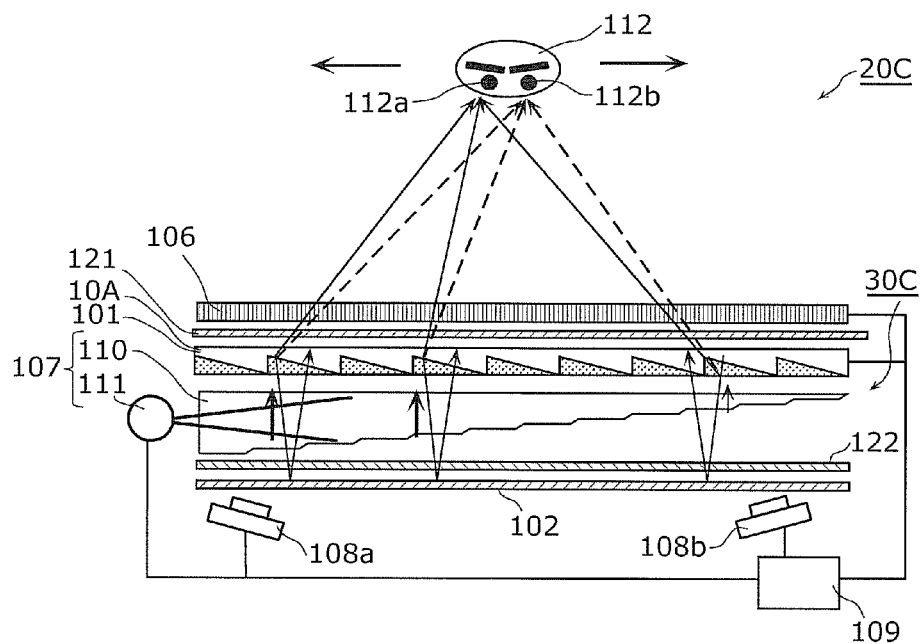
FIG. 4B is a cross-sectional view of a liquid crystal display apparatus according to Embodiment 4.

FIG. 4B is a cross-sectional view of a liquid crystal display apparatus according to Embodiment 4. As shown in FIG. 4B, a liquid crystal display apparatus 20C according to Embodiment 4 includes the optical deflection apparatus 30C, and a liquid crystal panel 106 on which light emitted from the optical deflection apparatus 30C is incident. The liquid crystal panel 106 is provided at one side of the optical deflection apparatus 30C, which is the side closer to a polarizing reflective sheet 121. The optical deflector 10A of the optical deflection apparatus 30C includes an array of the optical deflection elements 101. A light emitting unit 107 of the optical deflection apparatus 30C includes a light guide plate 110 and a light source 111 in the similar manner to the light emitting unit 107 according to Embodiment 1. Light emitted from the light source 111 has a first polarization direction. The other elements included in the liquid crystal display apparatus 20C are similar to those included in the liquid crystal display apparatus 20 according to Embodiment 1.

The light emitted from the light guide plate 110 of the light emitting unit 107 is incident on an optical deflector 10A, passes through the optical deflector 10A three times, and then is emitted from the optical deflector 10A, as in the similar manner to above. Accordingly, the liquid crystal display apparatus 20C according to Embodiment 4 can further increase the light deflection angle. As a result, it is possible to achieve the liquid crystal display apparatus 20C which provides a greater visual field with a relatively simple structure.

Furthermore, the optical deflection apparatus 30 according to Embodiment 3 can also constitute a liquid crystal display apparatus by providing the liquid crystal panel 106 at one side of the optical deflection apparatus 30 in the similar manner.

Embodiment 5

Figure 5:
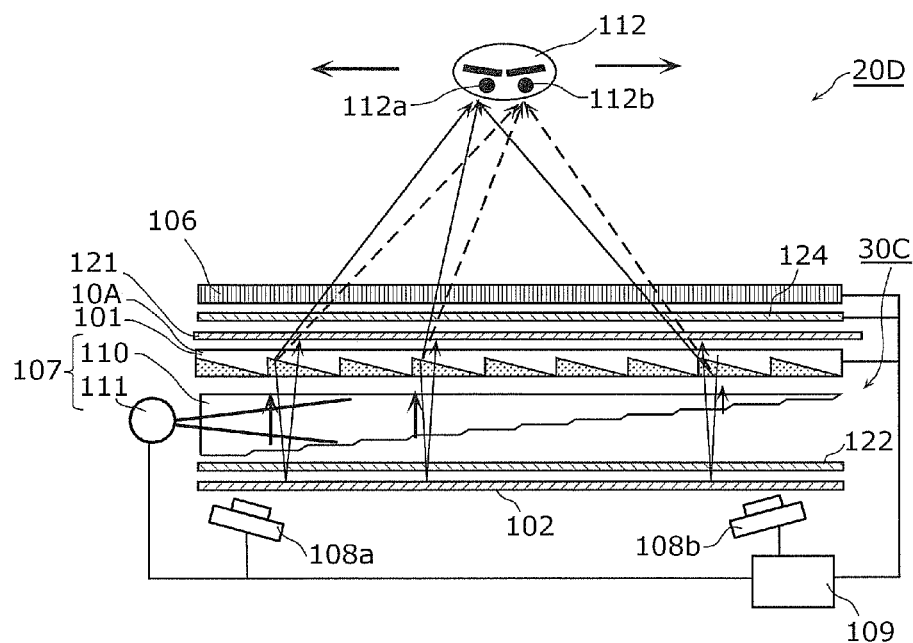
FIG. 5 is a cross-sectional view of a liquid crystal display apparatus according to Embodiment 5.

FIG. 5 is a cross-sectional view of a liquid crystal display apparatus according to Embodiment 5. As shown in FIG. 5, a liquid crystal display apparatus 20D according to Embodiment 5 includes a polymer liquid crystal diffuser panel 124 (which constitutes a diffuser panel) between a liquid crystal panel 106 and an optical deflection apparatus 30C. A control unit 109 controls voltage to be applied to the polymer liquid crystal diffuser panel 124. In a state where voltage is not applied to the polymer liquid crystal diffuser panel 124 by the control unit 109, the polymer liquid crystal diffuser panel 124 has translucent white color and is kept in a diffusion state where light is diffused. In a state where voltage is applied to the polymer liquid crystal diffuser panel 124 by the control unit 109, the polymer liquid crystal diffuser panel 124 is transparent and is kept in a non-diffusion state where light is transmitted without diffusion. Accordingly, the polymer liquid crystal diffuser panel 124 can be switched between the diffusion state and the non-diffusion state by the control unit 109.

In a case where the liquid crystal display apparatus 20D is used as a 3D display or a privacy display, the polymer liquid crystal diffuser panel 124 is kept in the non-diffusion state by applying voltage to the polymer liquid crystal diffuser panel 124. In this way, light can be alternately deflected toward a right eye 112a and a left eye 112b of a viewer 112 in a state where polymer liquid crystal diffuser panel 124 does not diffuse light.

On the other hand, in a case where the liquid crystal display apparatus 20D is used as a 2D display, the polymer liquid crystal diffuser panel 124 is kept in a diffusion state by not applying voltage to the polymer liquid crystal diffuser panel 124, and the refractive index NL of the liquid crystal 103 and the refractive index ND of the dielectric 104 are set to the same value. Accordingly, light emitted from the optical deflection apparatus 30C is incident on the liquid crystal panel 106 in a diffused state, thereby illuminating the liquid crystal panel 106 at a greater angle.

With this, it is possible to achieve the liquid crystal display apparatus 20D which is switchable between 2D display and 3D display or privacy display.

In Embodiment 5, the polymer liquid crystal diffuser panel 124 is used as a diffuser panel which is switchable between a diffusion state and a non-diffusion state; however, the present disclosure is not limited to this, and any other units including the similar function may be used.

Embodiment 6

Figure 6A:
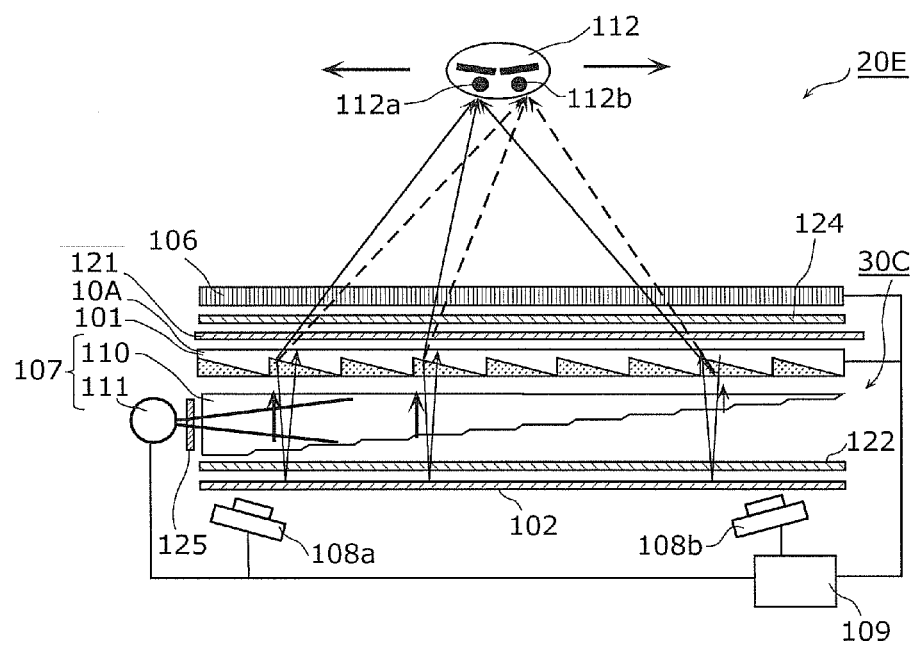
FIG. 6A is a cross-sectional view of a liquid crystal display apparatus according to Embodiment 6.
Figure 6B:
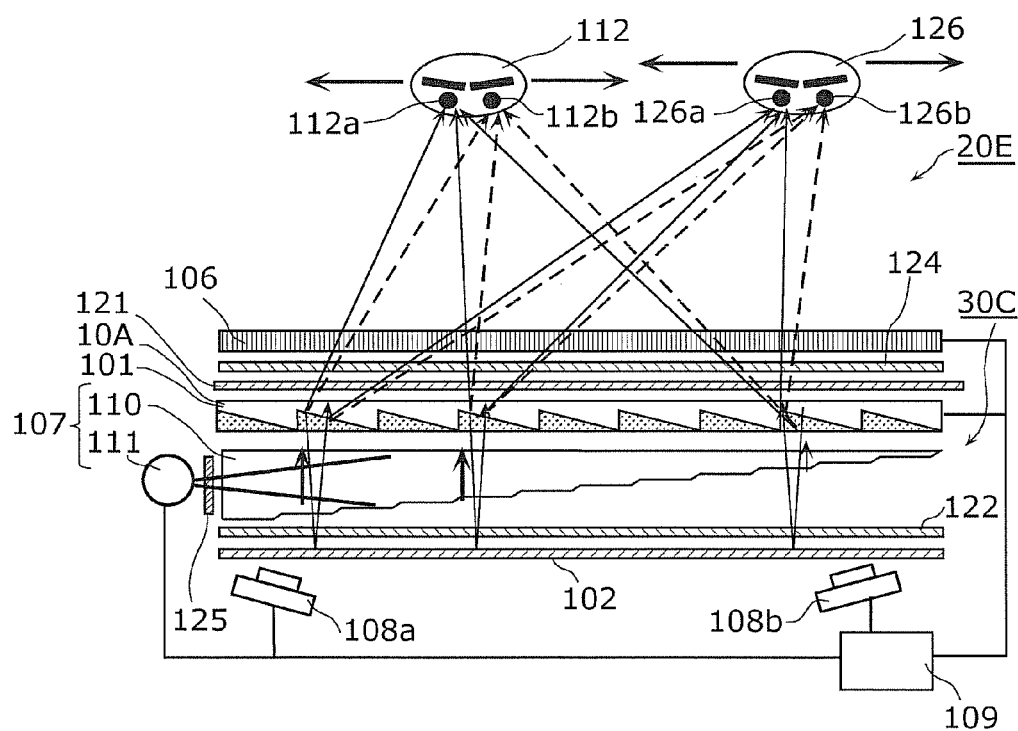
FIG. 6B is a cross-sectional view of a liquid crystal display apparatus according to Embodiment 6.

FIG. 6A and FIG. 6B are cross-sectional views of a liquid crystal display apparatus according to Embodiment 6. As shown in FIG. 6A, a liquid crystal display apparatus 20E according to Embodiment 6 includes a λ/2 plate 125 between a light source 111 and a light guide plate 110. The other elements included in the liquid crystal display apparatus 20E are similar to those included in the liquid crystal display apparatus 20D according to Embodiment 5.

The λ/2 plate 125 is a wave plate which has a function to convert linear polarization with a given oscillation direction into linear polarization with a oscillation direction orthogonal to the oscillation direction of the linear polarization, and has a function to generate phase difference of ½ of wavelength λ (that is, phase difference of 180 degrees) between linear polarization which oscillate in a direction vertical to each other. By rotating the position of the λ/2 plate 125 about an optical axis, it is possible to switch the polarization direction of light passed through the λ/2 plate 125. Hence, even when light emitted from the light source 111 has a single polarization, it is possible to modulate the polarization direction of light incident on the light guide plate 110 by rotating the position of the λ/2 plate 125 about the optical axis. For example, in a case where the λ/2 plate 125 is positioned at a first rotation position, light is polarized in a first polarization direction, and where the λ/2 plate 125 is positioned at a second rotation position, light is polarized in a second polarization direction.

When light, which is polarized in the second polarization direction by positioning the λ/2 plate 125 at the second rotation position, is incident on the light guide plate 110, the light arrived at the polarizing reflective sheet 121 passes through the polarizing reflective sheet 121. For example, in a case where the liquid crystal display apparatus 20E is used as a 2D display, light arrives at the polymer liquid crystal diffuser panel 124 without passing through the optical deflector 10A a plurality of times, by polarizing light incident on the light guide plate 110 in the second deflection direction, and by setting the refractive index NL of the liquid crystal 103 and the refractive index ND of the dielectric 104 of the optical deflector 10A to the same value. Accordingly, it is possible to reduce light loss caused by light passing extra path, resulting in increasing light use efficiency of the liquid crystal display apparatus 20E as a 2D display.

Furthermore, when light polarized in the first polarization direction is incident on the light guide plate 110 by positioning the λ/2 plate 125 at the first rotation position, the light arrived at the polarizing reflective sheet 121 is reflected by the polarizing reflective sheet 121. After that, the light passes through the optical deflector 10A twice, and passes through the polarizing reflective sheet 121. Accordingly, the liquid crystal display apparatus 20E may be used as a 3D display or a privacy display.

In Embodiment 6, the λ/2 plate 125 is used as a unit for switching the polarization direction of light; however, the present disclosure is not limited to this, but other units may be used.

Furthermore, by adjusting the position of the λ/2 plate 125 to a position between the first rotation position and the second rotation position, the polarization direction of light which passed through the λ/2 plate 125 includes polarization components of both the first polarization direction and the second polarization direction. As shown in FIG. 6B, light, having polarization components of the second polarization direction, passes through the optical deflector 10A once, passes through the polarizing reflective sheet 121, and is deflected toward the eyes 112a and 112b of the viewer 112. Light, having polarization components of the first polarization direction, passes through the optical deflector 10A three times, passes through the polarizing reflective sheet 121, and is deflected toward eyes 126a and 126b of a viewer 126. In this way, the polarization direction of light incident on the light guide plate 110 includes the polarization components of both of the first polarization direction and the second polarization direction; and thus, light can be deflected concurrently in two directions of the viewer 112 and the viewer 126. Accordingly, it is possible for the viewers 112 and 126 to concurrently view 3D images displayed on the liquid crystal panel 106.

Embodiment 7

Figure 7:
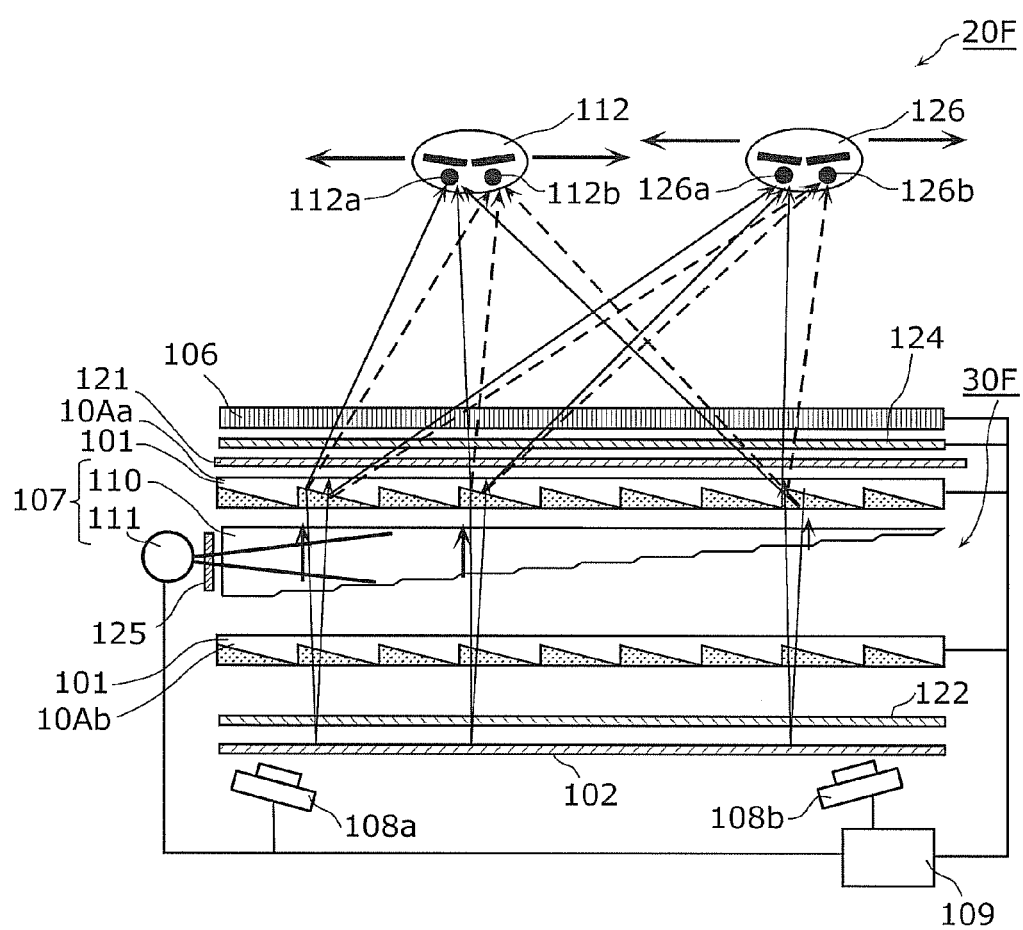
FIG. 7 is a cross-sectional view of a liquid crystal display apparatus according to Embodiment 7.

FIG. 7 is a cross-sectional view of a liquid crystal display apparatus according to Embodiment 7. As shown in FIG. 7, in a liquid crystal display apparatus 20F according to Embodiment 7, an optical deflection apparatus 30F includes a first optical deflector 10Aa and a second optical deflector 10Ab, as optical deflectors. The first optical deflector 10Aa is provided between a light guide plate 110 of a light emitting unit 107 and a polarizing reflective sheet 121. The second optical deflector 10Ab is provided between the light guide plate 110 of the light emitting unit 107 and a λ/4 plate 122. The first optical deflector 10Aa and the second optical deflector 10Ab include a structure similar to those of the optical deflector 10A according to Embodiment 6. The other elements included in the liquid crystal display apparatus 20F are similar to those included in the liquid crystal display apparatus 20E according to Embodiment 6.

Next, a description is given of a mechanism of operations performed by the liquid crystal display apparatus 20F according to Embodiment 7. A polymer liquid crystal diffuser panel 124 is kept in a non-diffusion state by a control unit 109. In the similar manner to Embodiment 6, the polarization direction of light which passed through the λ/2 plate 125 includes the polarization components of both the first polarization direction and the second polarization direction. Light, having the second polarization direction components, is emitted from the light guide plate 110, passes through the optical deflector 10Aa only once, and then passes through the polarizing reflective sheet 121. After that, the light is incident on the liquid crystal panel 106, is emitted from the liquid crystal panel 106, and is deflected toward eyes 112a and 112b of a viewer 112.

Light, having the first polarization direction components, is emitted from the light guide plate 110, passes through the optical deflector 10Aa, and then is reflected by the polarizing reflective sheet 121. After that, the light passes through the optical deflector 10Aa again, further passes through the optical deflector 10Ab, and then is incident on the λ/4 plate 122. The light reflected by the reflective plate 102 passes through the optical deflector 10Ab and the optical deflector 10Aa again, passes through the polarizing reflective sheet 121, and then is incident on the liquid crystal panel 106. Accordingly, the light emitted from the liquid crystal panel 106 is deflected toward eyes 126a and 126b of a viewer 126. As a result, according to the liquid crystal display apparatus 20F in Embodiment 7, it is possible for the viewers 112 and 126 to concurrently view 3D images displayed on the liquid crystal panel 106.

As described, light deflected by passing through the optical deflector 10Aa once is collected onto the eyes 112a and 112b of the viewer 112, and light deflected by passing through the optical deflector 10Aa three times and the optical deflector 10Ab twice is collected onto the eyes 126a and 126b of the viewer 126. After determining refractive index NL of a liquid crystal 103 included in the optical deflector 10Aa to deflect light toward the viewer 112, and refractive index NL of a liquid crystal 103 included in the optical deflector 10Ab is determined to deflect light toward the viewer 126. As a result, it is possible to independently deflect light toward the viewer 112 and the viewer 126 even when they are located at different positions.

By arbitrary setting the ratio of light having the first polarization direction components and the ratio of light having the second polarization direction components to light incident on the light guide plate 110, it is possible to arbitrary set the ratio of an amount of light independently deflected toward the viewer 112 and the viewer 126.

Embodiment 8

Figure 8:
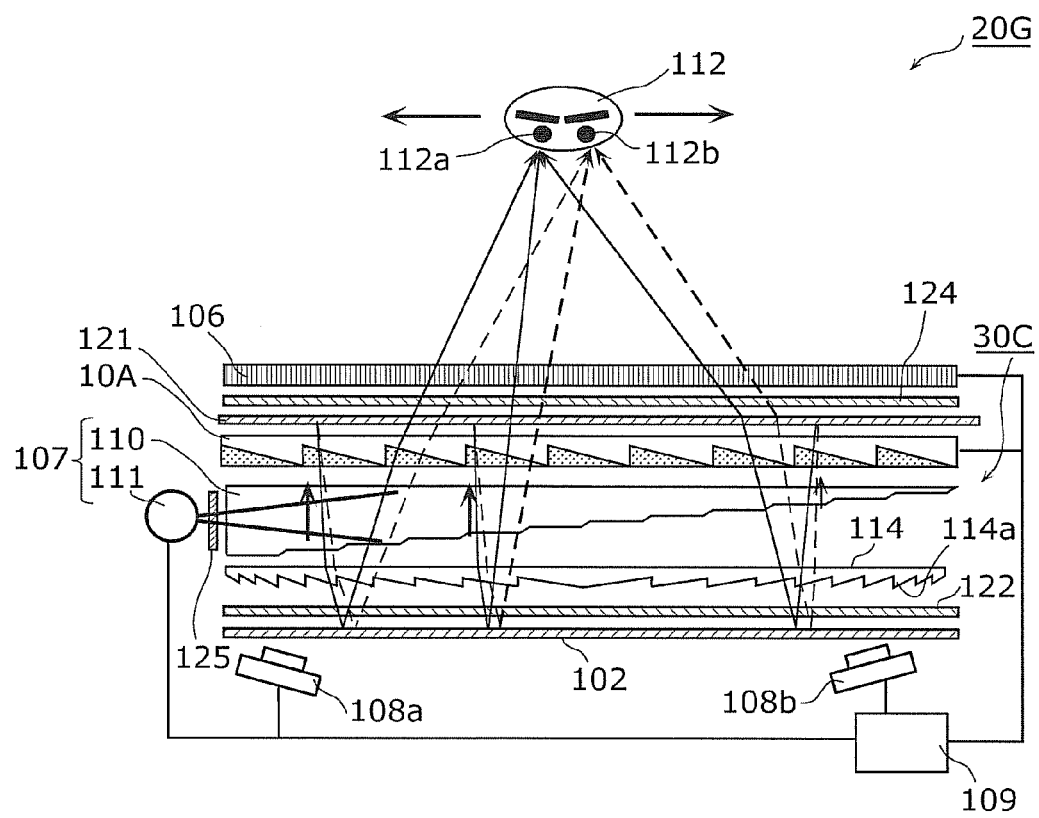
FIG. 8 is a cross-sectional view of a liquid crystal display apparatus according to Embodiment 8.

FIG. 8 is a cross-sectional view of a liquid crystal display apparatus according to Embodiment 8. As shown in FIG. 8, a liquid crystal display apparatus 20G according to Embodiment 8 includes a prism sheet 114 (which constitutes an optical element) between a light guide plate 110 of a light emitting unit 107 and a λ/4 plate 122. The prism sheet 114 have a similar structure to that of the prism sheet 114 according to Embodiment 2. The other elements included in the liquid crystal display apparatus 20G are similar to those included in the liquid crystal display apparatus 20E according to Embodiment 6.

In the similar manner to Embodiment 6, the polarization direction of light which passed through the λ/2 plate 125 is switchable between the first polarization direction and the second polarization direction. When light, polarized in the second polarization direction, is incident on the light guide plate 110, the light arrived at a polarizing reflective sheet 121 passes through the polarizing reflective sheet 121. When light polarized in the first polarization direction is incident on the light guide plate 110, the light arrived at the polarizing reflective sheet 121 is reflected by the polarizing reflective sheet 121, and passes through the optical deflector 10A twice. Here, while the light travels back and forth between the polarizing reflective sheet 121 and the reflective plate 102, the light passes through the prism sheet 114 twice.

Accordingly, the advantageous effects similar to those in Embodiment 2 can be obtained by including the prism sheet 114 in the liquid crystal display apparatus 20G according to Embodiment 8.

In Embodiment 8, the prism sheet 114 is provided between the light guide plate 110 and the λ/4 plate 122; however, the prism sheet 114 may be provided between the λ/4 plate 122 and the reflective plate 102. Furthermore, in a case where the liquid crystal display apparatus 20G is used as a 2D display, light polarized in the second polarization direction does not pass through the prism sheet 114 by positioning the prism sheet 114 at a position lower than the light guide plate 110. Hence, the prism sheet 114 does not affect viewing angle of 2D images.

Note that in Embodiment 8, the prism sheet 114 is used as an optical element; however, the present disclosure is not limited to this. For example, a Fresnel sheet may be used as an optical element.

Embodiment 9

Figure 9:
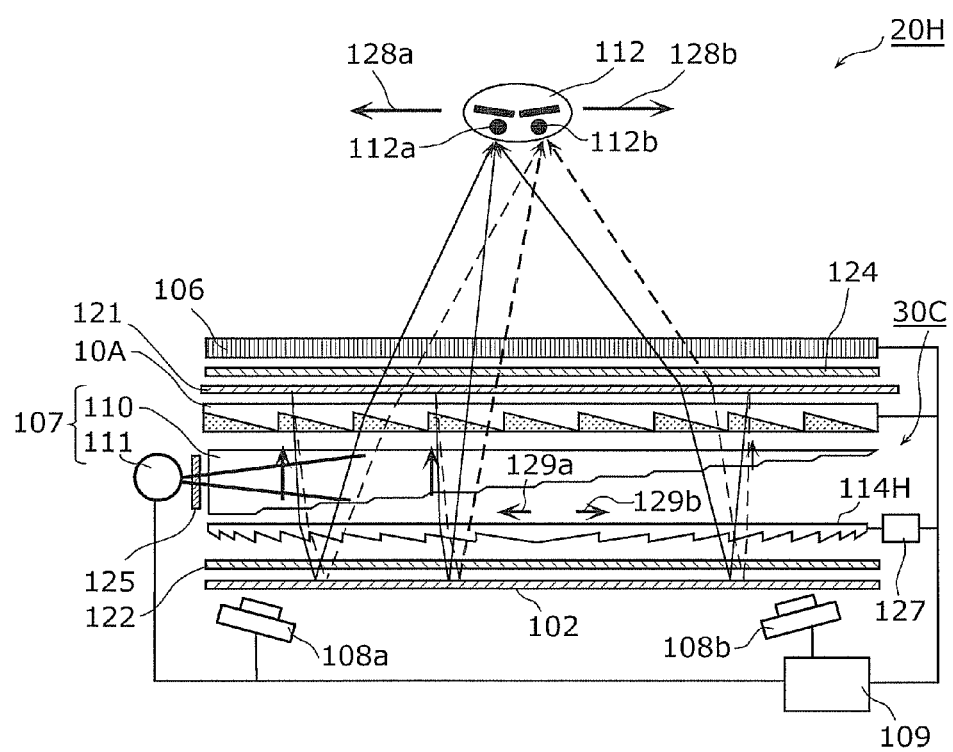
FIG. 9 is a cross-sectional view of a liquid crystal display apparatus according to Embodiment 9.

FIG. 9 is a cross-sectional view of a liquid crystal display apparatus according to Embodiment 9. As shown in FIG. 9, a liquid crystal display apparatus 20H according to Embodiment 9 includes an actuator 127 for moving a prism sheet 114H to the deflection direction of light (horizontal direction in FIG. 9). By moving the prism sheet 114H to the light deflection direction using the actuator 127, it is possible to horizontally adjust the collection point of light emitted from a liquid crystal panel 106. The prism sheet 114H according to Embodiment 9 is an active optical element which is capable of modulating a collection point of light emitted from the liquid crystal panel 106, according to the movement of a right eye 112a and a left eye 112b of a viewer 112.

In a case where the position of the viewer 112 moves horizontally as indicated by arrows 128a and 128b in FIG. 9, the position of the viewer 112 is detected by a pair of stereo cameras 108a and 108b. A control unit 109 drives the actuator 127 based on detection signals from the pair of stereo cameras 108a and 108b. As a result, the prism sheet 114H is moved horizontally by the actuator 127 as indicated by arrows 129a and 129b in FIG. 9. For example, in a case where the position of the viewer 122 is moved in the direction indicated by the arrow 128a, the actuator 127 is driven based on a command from the control unit 109, and the prism sheet 114H is moved by a predetermined amount in the direction indicated by the arrow 129a. More specifically, by driving the actuator 127 to adjust the position of the prism sheet 114H based on the detected positions of the right eye 112a and the left eye 112b of the viewer 112, it is possible to continuously collect light from the liquid crystal panel 106 onto the right eye 112a and the left eye 112b of the viewer 112 even when the position of the viewer 112 is moved. As a result, the viewer 112 is capable of continuously viewing 3D images and the like.

In the liquid crystal display apparatus 20H according to Embodiment 9, an optical deflector 10A deflects light toward the right eye 112a and the left eye 112b of the viewer 112, and the prism sheet 114H driven by the actuator 127 follows the light collection point moved along the movement of the right eye 112a and the left eye 112b of the viewer 112. This provides the following advantageous effects. For example, in a case where images are displayed on the liquid crystal panel 106 at a frequency of 60 Hz, the speed for deflecting light (deflection speed) toward the right eye 112a and the left eye 112b of the viewer 112 needs to be a few milliseconds (120 Hz). In order to increase the deflection speed of the optical deflector 10A, the height H of a liquid crystal 103 of the optical deflector 10A needs to be lower as much as possible; however, in such a case, it is difficult to increase the angle of light deflected by the optical deflector 10A. On the other hand, following the light collection point moved along with the movement of the positions of the right eye 112a and the left eye 112b of the viewer 112 does not require a fast response speed such as a few milliseconds that is required when deflecting light toward the right eye 112a and the left eye 112b of the viewer 112.

Accordingly, as in the liquid crystal display apparatus 20H according to Embodiment 9, the optical deflector 10A deflects light toward the right eye 112a and the left eye 112b of the viewer 112, which requires a fast response speed, and the prism sheet 114H follows the light collection point moved along with the movement of the right eye 112a and the left eye 112b of the viewer 112, which does not require a fast response speed. As a result, it is possible to achieve the liquid crystal display apparatus 20H which provides a greater visual field, in which the light collection point can be easily followed even when the position of the viewer significantly shifts.

In Embodiment 9, the prism sheet 114H driven by the actuator 127 is used as an active optical element; however, any other units, such as a liquid crystal lens, may be used which have the similar functions.

Furthermore, in the liquid crystal display apparatus 20B according to Embodiment 2, too, the prism sheet 114 may be configured as an active optical element driven by the actuator 127, as in Embodiment 9.

Embodiment 10

Structure of Light Deflection Apparatus

Figure 10A:
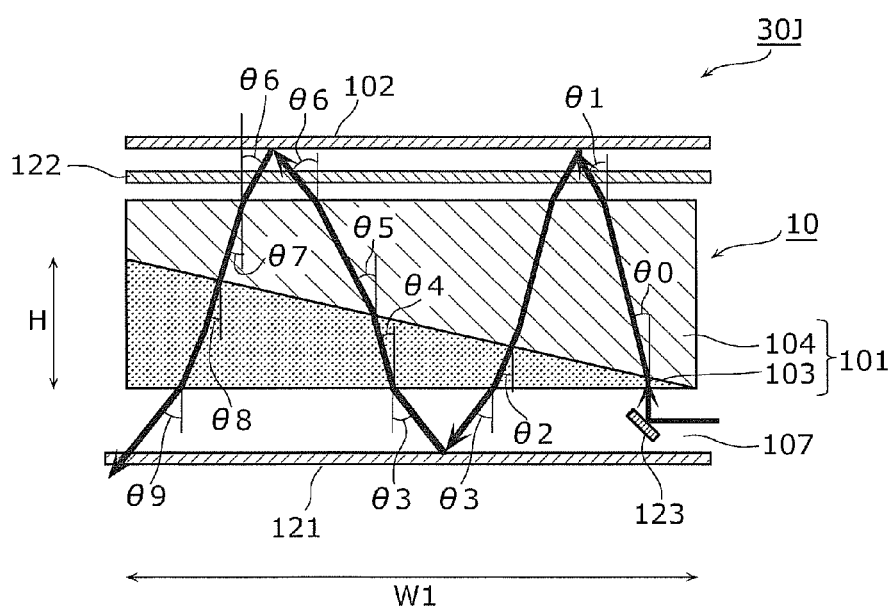
FIG. 10A is a cross-sectional view of an optical deflection apparatus according to Embodiment 10.

FIG. 10A is a cross-sectional view of an optical deflection apparatus according to Embodiment 10. As shown in FIG. 10A, an optical deflection apparatus 30J according to Embodiment 10 includes a reflective plate 102 at one side of an optical deflector 10. A $\lambda/4$ plate 122 is provided between the optical deflector 10 and the reflective plate 102. A polarizing reflective sheet 121 is provided at the other side of the optical deflector 10. A light emitting unit 107 is provided between the optical deflector 10 and the polarizing reflective sheet 121. Light emitted from a light source (not shown) has a second polarization direction, is specularly reflected by the reflective plate 123, and is emitted toward the optical deflector 10.

Next, a description is given of a method for deflecting light performed by the optical deflection apparatus 30J according to Embodiment 10. For example, a description is given of a case where a liquid crystal 103 has a refractive index NL of is 1.5, a height H of 15 μm, and a width W1 of 50 μm, and a dielectric 104 has a refractive index ND of 1.4.

Light incident on the crystal 103 of the optical deflector 10 from the reflective plate 123 in a substantially vertical direction is refracted at the interface between the liquid crystal 103 and the dielectric 104 at an angle of, for example, $\theta 0=1.2$ degrees. Then, the light travels through the dielectric 104, and is emitted from the dielectric 104 into the air at an angle of, for example, $\theta 1=1.7$ degrees. The light emitted from the dielectric 104 is converted from linear polarization into circular polarization by passing through the $\lambda/4$ plate 122, and is converted from circular polarization into linear polarization by being specularly reflected by the reflective plate 102 and passing through the $\lambda/4$ plate 122 again. The light emitted from the $\lambda/4$ plate 122 is incident on the dielectric 104 of the optical deflection element 101 again with being polarized in the first polarization direction. After that, the light travels through the dielectric 104, and is refracted at the interface between the dielectric 104 and the liquid crystal 103 at an angle of, for example, $\theta 2=2.3$ degrees. The light which traveled through the liquid crystal 103 is emitted from the liquid crystal 103 at an angle of, for example, $\theta 3=3.4$ degrees, and then is incident on the polarizing reflective sheet 121. Since the light incident on the polarizing reflective sheet 121 has a first polarization direction, the light is reflected by the polarizing reflective sheet 121, and is incident on the liquid crystal 103 again at an angle of, for example, $\theta 3=3.4$ degrees.

After that, the light is refracted at the interface between the air and the liquid crystal 103 at an angle of, for example, $\theta 4=2.3$ degrees, travels through the liquid crystal 103, and is refracted at the interface between the liquid crystal 103 and the dielectric 104 at an angle of, for example, $\theta 5=3.7$ degrees. The light which traveled through the dielectric 104 is emitted from the dielectric 104 into the air at an angle of, for example, $\theta 6=5.2$ degrees, passes through the $\lambda/4$ plate 122, and is specularly reflected by the reflective plate 102.

By the light specularly reflected by the reflective plate 102 passing through the λ/4 plate 122 again, the light emitted from the λ/4 plate 122 is incident on the dielectric 104 of the optical deflection element 101 again with being polarized in the second polarization direction.

The light incident on the dielectric 104 is refracted at the interface between the air and the dielectric 104 at an angle of, for example, θ7=3.7 degrees, travels through the dielectric 104, and is refracted at the interface between the dielectric 104 and the liquid crystal 103 at an angle of, for example, θ8=4.6 degrees. The light which traveled through the liquid crystal 103 is emitted from the liquid crystal 103 at an angle of, for example, θ9=6.9 degrees, and then is incident on the polarizing reflective sheet 121. Since the light incident on the polarizing reflective sheet 121 has the second polarization direction, the light passes through the polarizing reflective sheet 121, and is emitted to outside. Hence, the angle of light deflected by the optical deflection apparatus 30J according to Embodiment 10 is the angle θ9=6.9 degrees, that is, the angle four times as large as the angle θ1. Furthermore, each of the angles θ0 to θ9 is an angle relative to the vertical direction.

As described, in the optical deflection apparatus 30J according to Embodiment 10, light incident on the optical deflector 10 is emitted from the optical deflector 10 after passing through the optical deflector 10 four times. Such a simple structure allows the light deflection angle to be further increased.

As described in Embodiments 1, 3, and 4, the deflection angle of light which passes through the optical deflector 10 once is 1.7 degrees, the deflection angle of light which passes through the optical deflector 10 twice is 3.4 degrees, and the deflection angle of light which passes through the optical deflector 10 three times is 5.2 degrees. In Embodiment 10, the deflection angle of light which passes through the optical deflector 10 four times is 6.9 degrees. Hence, it is understood that each time light is deflected by the optical deflector 10, the light deflection angle of 1.7 degrees is added.

In a conventional method where the light deflection angle is increased by using the lens array 608 shown in FIG. 15B, in a case where the incident angle is different from the design value by, for example, 1 degree, when the angle is increased by the lens array 608, the deflection angle of light emitted from the lens array 608 is increased by a magnification factor of the lens array 608. More specifically, in a case where the light deflection angle is quadruplicated by the lens array 608 and the incident angle is different from the design value by 1 degree, the outgoing angle is different from the design value by 4 degrees. In contrast, in the optical deflection apparatus 30J according to Embodiment 10, light is deflected by the optical deflector 10 a plurality of times; and thus, the amount of the outgoing angle different from the design value does not vary. More specifically, in a case where light is deflected by the optical deflector 10 four times and the incident angle is different from the design value by 1 degree, the outgoing angle is different from the design value by 1 degree. Accordingly, it is possible for the optical deflection apparatus 30J according to Embodiment 10 to deflect light with high accuracy and less errors.

(Structure of Liquid Crystal Display Apparatus)

Figure 10B:
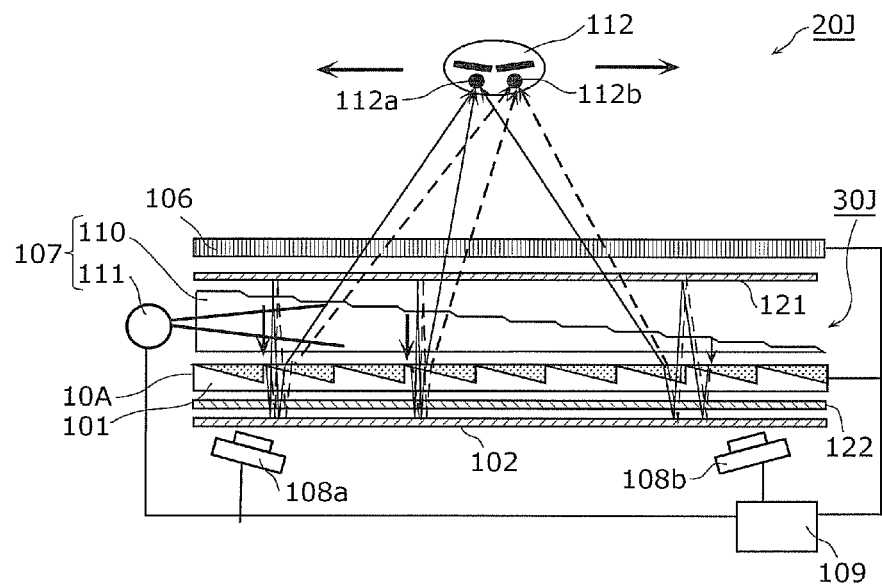
FIG. 10B is a cross-sectional view of a liquid crystal display apparatus according to Embodiment 10.

FIG. 10B is a cross-sectional view of a liquid crystal display apparatus according to Embodiment 10. As shown in FIG. 10B, the liquid crystal display apparatus 20J according to Embodiment 10 includes the optical deflection apparatus 30J, and a liquid crystal panel 106 on which the light emitted from the optical deflection apparatus 30J is incident. The liquid crystal panel 106 is provided at one side of the optical deflection apparatus 30J which is closer to the polarizing reflective sheet 121. An optical deflector 10A of the optical deflection apparatus 30J includes an array of optical deflection elements 101. A light emitting unit 107 of the optical deflection apparatus 30J includes a light guide plate 110 and a light source 111 in the similar manner to the light emitting unit 107 according to Embodiment 1. Light emitted from the light source 111 is polarized in a second polarization direction. The other elements included in the liquid crystal display apparatus 20J are similar to those included in the liquid crystal display apparatus 20 according to Embodiment 1.

The light emitted from the light guide plate 110 of the light emitting unit 107 is incident on the optical deflector 10A, passes through the optical deflector 10A four times, and then is emitted from the optical deflector 10A, as in the similar manner to above. Accordingly, in the liquid crystal display apparatus 20J according to Embodiment 10, it is possible to further increase the light deflection angle. As a result, it is possible to achieve the liquid crystal display apparatus 20J which provides a greater visual field with a relatively simple structure.

Embodiment 11

Figure 11:
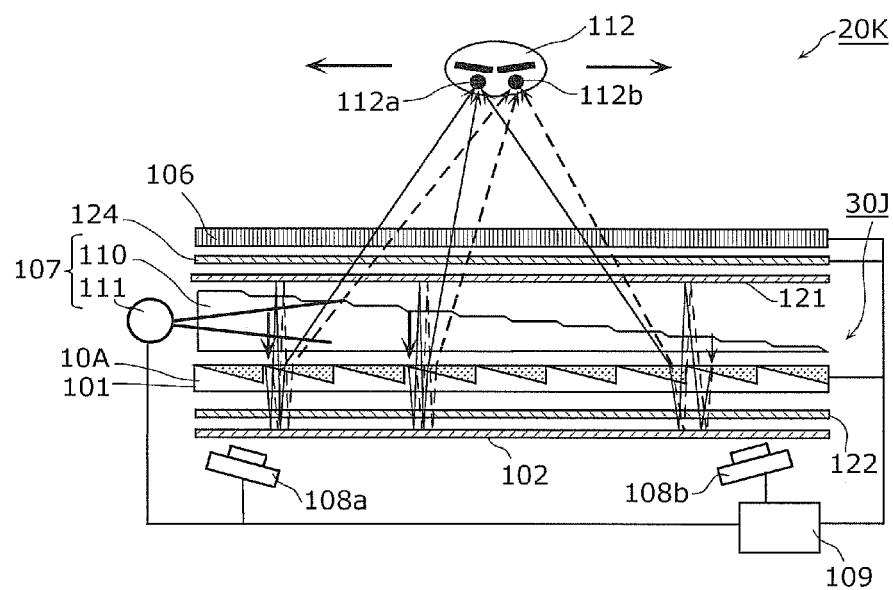
FIG. 11 is a cross-sectional view of a liquid crystal display apparatus according to Embodiment 11.

FIG. 11 is a cross-sectional view of a liquid crystal display apparatus according to Embodiment 11. As shown in FIG. 11, a liquid crystal display apparatus 20K according to Embodiment 11 includes a polymer liquid crystal diffuser panel 124 (which constitutes a diffuser panel) between a liquid crystal panel 106 and an optical deflection apparatus 30J. The polymer liquid crystal diffuser panel 124 has a structure similar to that of the polymer liquid crystal diffuser panel 124 according to Embodiment 5. The other elements included in the liquid crystal display apparatus 20K are similar to those included in the liquid crystal display apparatus 20J according to Embodiment 10.

Accordingly, it is possible to achieve the liquid crystal display apparatus 20K which is switchable between 2D display and 3D display or privacy display, in the similar manner to Embodiment 5.

In a case where the liquid crystal display apparatus 20K is used as a 2D display, by making the polarization direction of light incident on the light guide plate to a first polarization direction, light emitted from the light guide plate 110 is emitted from the polarizing reflective sheet 121 after traveling back and forth between an optical deflector 10A and the light guide plate 110. As a result, it is possible to reduce light loss caused when light passes through an optical material such as the optical deflector 10A, leading to the liquid crystal display apparatus 20K with higher light use efficiency.

Embodiment 12

Figure 12:
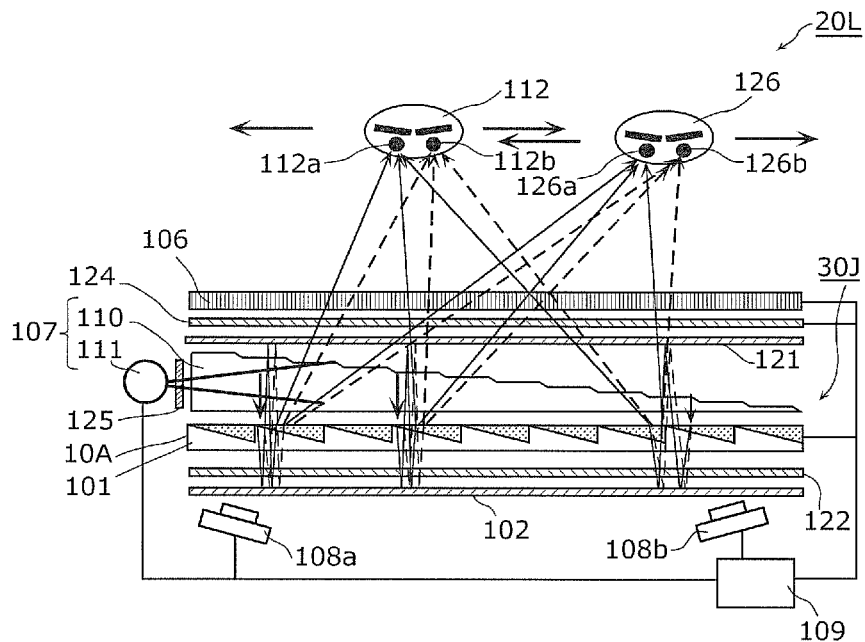
FIG. 12 is a cross-sectional view of a liquid crystal display apparatus according to Embodiment 12.

FIG. 12 is a cross-sectional view of a liquid crystal display apparatus according to Embodiment 12. As shown in FIG. 12, a liquid crystal display apparatus 20L according to Embodiment 12 includes a λ/2 plate 125 between a light source 111 and a light guide plate 110. The λ/2 plate 125 has a structure similar to that of the λ/2 plate 125 according to Embodiment 6. The other elements included in the liquid crystal display apparatus 20L are similar to those included in the liquid crystal display apparatus 20K according to Embodiment 11.

In the similar manner to Embodiment 6, the polarization direction of light passed through the λ/2 plate 125 includes the polarization components of both the first polarization direction and the second polarization direction. In a case where light, having first polarization direction components, is incident on the light guide plate 110, the light passes through the optical deflector 10A twice, arrives at the polarizing reflective sheet 121, and passes through the polarizing reflective sheet 121. Accordingly, the light emitted from the liquid crystal panel 106 is deflected toward eyes 112a and 112b of a viewer 112.

In a case where light, having second polarization direction components, is incident on the light guide plate 110, the light passes through the optical deflector 10A twice, arrives at the polarizing reflective sheet 121, is reflected by the polarizing reflective sheet 121, and further passes through the optical deflector 10A twice. After that, the light passes through the polarizing reflective sheet 121, and the light emitted from the liquid crystal panel 106 is deflected toward eyes 126a and 126b of a viewer 126.

Accordingly, in Embodiment 12, in the similar manner to Embodiment 6, two viewers 112 and 126 are capable of concurrently viewing 3D images and the like displayed on the liquid crystal panel 106. Furthermore, by switching the polarization direction of light incident on the light guide plate 110 between the first polarization direction and the second polarization direction, it is possible to switch a viewer who is allowed to view 3D images and the like between the viewer 112 and the viewer 126.

Embodiment 13

Figure 13:
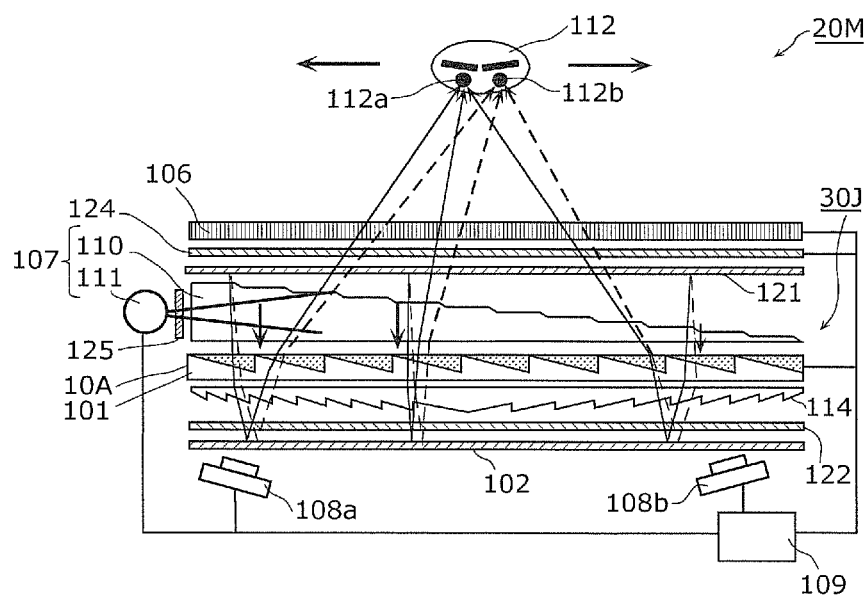
FIG. 13 is a cross-sectional view of a liquid crystal display apparatus according to Embodiment 13.
Figure 14A:
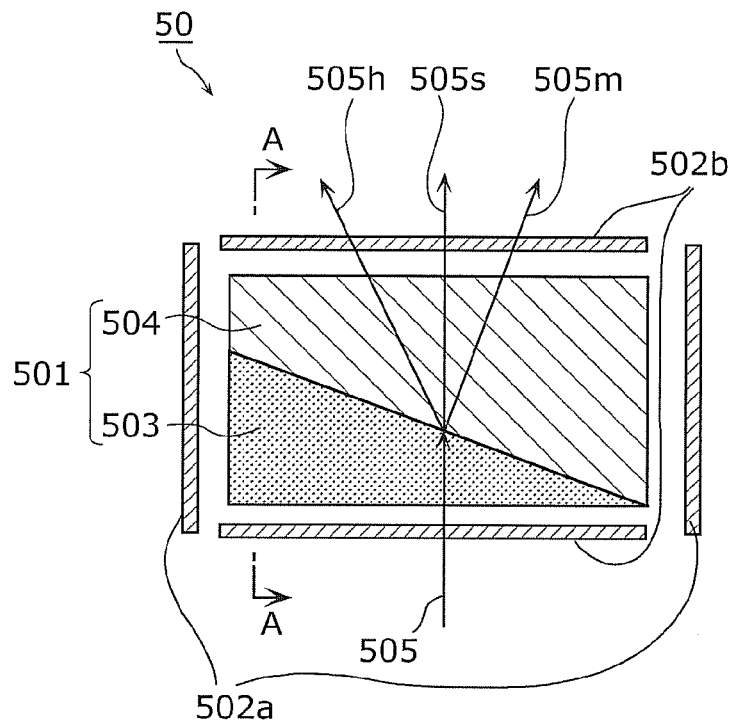
FIG. 14A is a cross-sectional view of a conventional optical deflector.
Figure 14B:
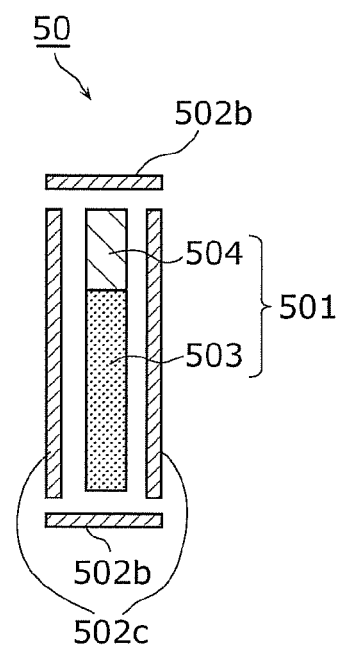
FIG. 14B is a cross-sectional view of the optical deflector taken along line A-A in FIG. 14A.
Figure 14C:
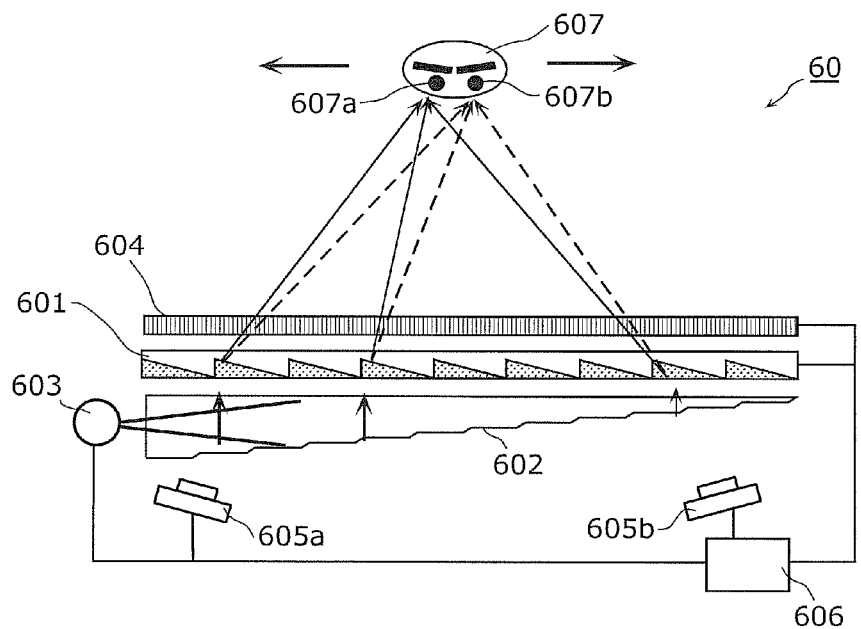
FIG. 14C is a cross-sectional view of a conventional liquid crystal display apparatus.

FIG. 13 is a cross-sectional view of a liquid crystal display apparatus according to Embodiment 13. As shown in FIG. 13, a liquid crystal display apparatus 20M according to Embodiment 13 includes a prism sheet 114 (which constitutes an optical element) between an optical deflector 10A and a λ/4 plate 122. The prism sheet 114 has a structure similar to that of the prism sheet 114 according to Embodiment 2. The other elements included in the liquid crystal display apparatus 20M are similar to those included in the liquid crystal display apparatus 20L according to Embodiment 13.

Accordingly, advantageous effects similar to those in Embodiment 2 can be obtained by including the prism sheet 114 in the liquid crystal display apparatus 20M according to Embodiment 13.

In Embodiment 13, the prism sheet 114 is provided between the optical deflector 10A and the λ/4 plate 122; however, the prism sheet 114 may be provided between the λ/4 plate 122 and the reflective plate 102. Furthermore, in Embodiment 13, the prism sheet 114 is used as an optical element; however, the present disclosure is not limited to this. For example, a Fresnel sheet may be used as an optical element.

Furthermore, in Embodiment 13, too, the prism sheet 114 may be configured as an active optical element driven by an actuator as in Embodiment 9.

While the above has been a description of Embodiments 1 to 13 of the present disclosure, the structure described in each of Embodiments 1 to 13 is merely an example, and it goes without saying that various modifications are possible within a scope that does not depart from the gist of the invention. Furthermore, it is of course possible to combine Embodiments 1 to 13 described above, or combine modifications.

INDUSTRIAL APPLICABILITY

The present disclosure is applicable to an optical deflector and an optical deflection apparatus which provide greater light deflection angle. Furthermore, the present disclosure may also be applicable to a liquid crystal display apparatus which displays high-quality 3D images and the like with a greater visual field in which 3D images and the like are viewable and with reduced crosstalk.

REFERENCE SIGNS LIST

10, 10A, 50, 601 Optical deflector
10Aa First optical deflector
10Ab Second optical deflector
20, 20B, 20C, 20D, 20E, 20F, 20G, 20H, 20J, 20K, 20L, 20M, 60, 70 Liquid crystal display apparatus
30, 30C, 30J Light deflection apparatus
101, 501 Light deflection element
102 Reflective plate
102a Reflective plane
103, 503 Liquid crystal
104, 504 Dielectric
106, 604 Liquid crystal panel
107 Light emitting unit
108a, 108b, 605a, 605b Stereo camera
109, 606 Control unit
110, 602 Light guide plate
111, 603 Light source
112, 126, 607 Viewer
112a, 126a, 607a Right eye
112b, 126b, 607b Left eye
114, 114H Prism sheet
114a Prism portion
121 Polarizing reflective sheet
122 λ/4 plate
123 Reflective plate
124 Polymer liquid crystal diffuser panel
125 λ/2 plate
127 Actuator
608 Lens array
608a, 608b Lens

The invention claimed is:

1. A liquid crystal display apparatus comprising:
an optical deflector including: a liquid crystal having a triangular shape in cross section; and a dielectric having a shape complementary to the triangular shape of the liquid crystal, the optical deflector deflecting incident light when a distribution of internal refraction indexes of the optical deflector is modulated by application of a voltage to the liquid crystal;
a polarizing reflective sheet which is provided at one side of the optical deflector, which reflects light having a first polarization direction, and which transmits light having a second polarization direction orthogonal to the first polarization direction;
a reflective plate which is provided at an other side of the optical deflector, and which specularly reflects light;
a λ/4 plate provided between the optical deflector and the reflective plate;
a light emitting unit which is provided between the polarizing reflective sheet and the λ/4 plate, and which emits, toward the polarizing reflective sheet, the light having the first polarization direction;
an optical element which is provided between the reflective plate and the light emitting unit, and which changes a traveling direction of light; and a liquid crystal panel on which light emitted from the polarizing reflective sheet is incident, wherein the light emitted from the light emitting unit passes through the optical deflector a plurality of times, is emitted from the polarizing reflective sheet, and is incident on the liquid crystal panel, the light emitted from the liquid crystal panel is alternately collected onto a right eye and a left eye of a viewer viewing the liquid crystal panel, and the optical element changes the traveling direction of the light to an intermediate position between the right eye and the left eye of the viewer while a voltage is being applied to the liquid crystal so that a difference between a refractive index of the liquid crystal and a refractive index of the dielectric is 0.

2. The liquid crystal display apparatus according to claim 1, wherein the light emitting unit is capable of switching a polarization direction of the light emitted from the light emitting unit between the first polarization direction and the second polarization direction orthogonal to the first polarization direction.

3. The liquid crystal display apparatus according to claim 1, wherein a polarization direction of the light emitted from the light emitting unit includes a polarization component of the first polarization direction and a polarization component of the second polarization direction orthogonal to the first polarization direction.

4. The liquid crystal display apparatus according to claim 1, wherein the optical element is a prism sheet or a Fresnel sheet.

5. The liquid crystal display apparatus according to claim 1, wherein the optical element is an active optical element which is capable of modulating a collection point of the light emitted from the liquid crystal panel, according to movement of the right eye and the left eye of the viewer.

6. The liquid crystal display apparatus according to claim 1, further comprising a diffuser panel provided between the polarizing reflective sheet and the liquid crystal panel, wherein the diffuser panel is switchable between a diffusion state where light is diffused and a non-diffusion state where light is transmitted without diffusion.

* * * * *